United States Patent
Tsuda et al.

(10) Patent No.: US 10,749,212 B2
(45) Date of Patent: Aug. 18, 2020

(54) ELECTROLYTE SOLUTION, BATTERY PACK, ELECTRONIC APPARATUS, ELECTRIC VEHICLE, POWER STORAGE APPARATUS, AND POWER SYSTEM

(71) Applicant: Murata Manufacturing Co., Ltd., Kyoto (JP)

(72) Inventors: Ryohei Tsuda, Kanagawa (JP); Toru Odani, Kanagawa (JP); Tadahiko Kubota, Kanagawa (JP)

(73) Assignee: MURATA MANUFACTURING CO., LTD., Kyoto (JP)

( * ) Notice: Subject to any disclaimer, the term of this patent is extended or adjusted under 35 U.S.C. 154(b) by 61 days.

(21) Appl. No.: 15/549,292

(22) PCT Filed: Feb. 26, 2016

(86) PCT No.: PCT/JP2016/001067
§ 371 (c)(1),
(2) Date: Aug. 7, 2017

(87) PCT Pub. No.: WO2016/136276
PCT Pub. Date: Sep. 1, 2016

(65) Prior Publication Data
US 2018/0040916 A1    Feb. 8, 2018

(30) Foreign Application Priority Data
Feb. 27, 2015    (JP) .................... 2015-038930

(51) Int. Cl.
*H01M 10/05* (2010.01)
*H01M 4/38* (2006.01)
*H01M 10/0567* (2010.01)
*H01M 10/052* (2010.01)

(52) U.S. Cl.
CPC ......... *H01M 10/0567* (2013.01); *H01M 4/38* (2013.01); *H01M 4/386* (2013.01); *H01M 10/052* (2013.01); *Y02E 60/122* (2013.01); *Y02T 10/7011* (2013.01)

(58) Field of Classification Search
CPC .... H01M 10/0567; H01M 4/38; H01M 4/386; H01M 10/052
See application file for complete search history.

(56) References Cited

U.S. PATENT DOCUMENTS

2005/0075250 A1    4/2005  MaCcone et al.
2013/0177799 A1    7/2013  Ihara et al.
2013/0224563 A1*   8/2013  Ihara ................. H01M 10/0566
                                                         429/150

FOREIGN PATENT DOCUMENTS

| CN | 103178291 A | 6/2013 |
| EP | 1520906 A1 | 4/2005 |
| GB | 1232285 A | 5/1971 |

(Continued)

OTHER PUBLICATIONS

English Translation of JP 2002-241335 (Year: 2002).*

(Continued)

*Primary Examiner* — Ula C Ruddock
*Assistant Examiner* — Frank A Chernow
(74) *Attorney, Agent, or Firm* — Chip Law Group

(57) ABSTRACT

A battery includes a positive electrode, a negative electrode, and an electrolyte solution, in which the electrolyte solution contains a predetermined compound.

16 Claims, 6 Drawing Sheets

(56) References Cited

FOREIGN PATENT DOCUMENTS

| IT | MI20031913 A1 | 4/2005 |
|---|---|---|
| JP | 2002-241335 A | 8/2002 |
| JP | 2005-113143 A | 4/2005 |
| JP | 2012-51863 A | 3/2012 |
| JP | 2013-134859 A | 7/2013 |

OTHER PUBLICATIONS

Office Action for CN Patent Application No. 20168001077.5, dated Sep. 4, 2019, 08 pages of Office Action.
Office Action for CN Patent Application No. 201680010773.5, dated Jan. 25, 2019, 10 pages of Office Action and 13 pages of English Translation.
International Search Report and Written Opinion of PCT Application No. PCT/JP2016/001067, dated May 17, 2016, 02 pages of English Translation and 07 pages of ISRWO.
Farnham, W. B. et al., "Fluorinated Macrocyclic Ethers as Fluoride Ion Hosts. Novel Structures and Dynamic Properties", Journal of the American Chemical Society, vol. 112, No. 21, ISSN 0002-7863, 1990, pp. 7707-7718.
Office Action for CN Patent Application No. 201680010773.5, dated Jun. 3, 2020, 03 pages of Office Action and 05 pages of English Translation.

\* cited by examiner

ELECTROLYTE SOLUTION, BATTERY PACK, ELECTRONIC APPARATUS, ELECTRIC VEHICLE, POWER STORAGE APPARATUS, AND POWER SYSTEM

CROSS REFERENCE TO RELATED APPLICATIONS

This application is a U.S. National Phase of International Patent Application No. PCT/JP2016/001067 filed on Feb. 26, 2016, which claims priority benefit of Japanese Patent Application No. JP 2015-038930 filed in the Japan Patent Office on Feb. 27, 2015. Each of the above-referenced applications is hereby incorporated herein by reference in its entirety.

TECHNICAL FIELD

The present technology relates to an electrolyte solution, a battery, a battery pack, an electronic apparatus, an electric vehicle, a power storage apparatus, and a power system.

BACKGROUND ART

Since lithium ion secondary batteries are lightweight and have a high energy density, lithium ion secondary batteries are widely used as power sources for mobile phones, laptop computers, electric tools, electric automobiles, and the like. Since characteristics of the lithium ion secondary battery largely depend on a non-aqueous electrolyte solution used, various additives added to the non-aqueous electrolyte solution have been proposed.

For example, Patent Literature 1 describes a technology for suppressing an increase in battery resistance due to repetition of charging and discharging by adding a cyclic disulfonic acid anhydride to an electrolyte solution.

CITATION LIST

Patent Literature

Patent Literature 1: Japanese Patent Application Laid-open No. 2012-199172

DISCLOSURE OF INVENTION

Technical Problem

It is an object of the present technology to provide an electrolyte solution, a battery, a battery pack, an electronic apparatus, an electric vehicle, a power storage apparatus, and a power system that are capable of suppressing an increase in battery resistance during storage.

Solution to Problem

In order to solve the above-mentioned problem, the present technology is an electrolyte solution, including: at least one of compounds represented by the following formulae (1) and (2).

[Chem. 1]

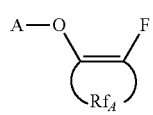
(1)

(in the formula (1), F represents a fluorine group. A represents a monovalent saturated hydrocarbon group, a monovalent unsaturated hydrocarbon group, a monovalent halogenated saturated hydrocarbon group, or a monovalent halogenated unsaturated hydrocarbon group. $Rf_A$ forms a ring and contains at least one —$CR_{A2}$— group, in which $R_A$ represents a hydrogen group, a fluorine group, a monovalent saturated hydrocarbon group, a monovalent unsaturated hydrocarbon group, a monovalent halogenated saturated hydrocarbon group, or a monovalent halogenated unsaturated hydrocarbon group.)

[Chem. 2]

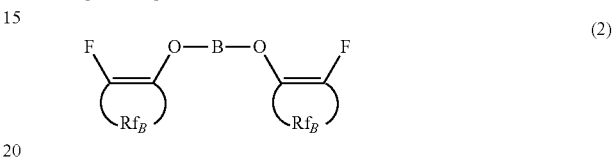
(2)

(in the formula (2), F represents a fluorine group. B represents a divalent saturated hydrocarbon group, a divalent unsaturated hydrocarbon group, a divalent halogenated saturated hydrocarbon group, or a divalent halogenated unsaturated hydrocarbon group. $Rf_B$ forms a ring and contains at least one —$CR_{B2}$— group, in which $R_B$ represents a hydrogen group, a fluorine group, a monovalent saturated hydrocarbon group, a monovalent unsaturated hydrocarbon group, a monovalent halogenated saturated hydrocarbon group, or a monovalent halogenated unsaturated hydrocarbon group.)

A battery, a battery pack, an electronic apparatus, an electric vehicle, a power storage apparatus, and a power system according to the present technology include the above-mentioned electrolyte solution.

Advantageous Effects of Invention

As described above, in accordance with the present technology, it is possible to suppress an increase in battery resistance during storage.

MODE(S) FOR CARRYING OUT THE INVENTION

Figure 1:
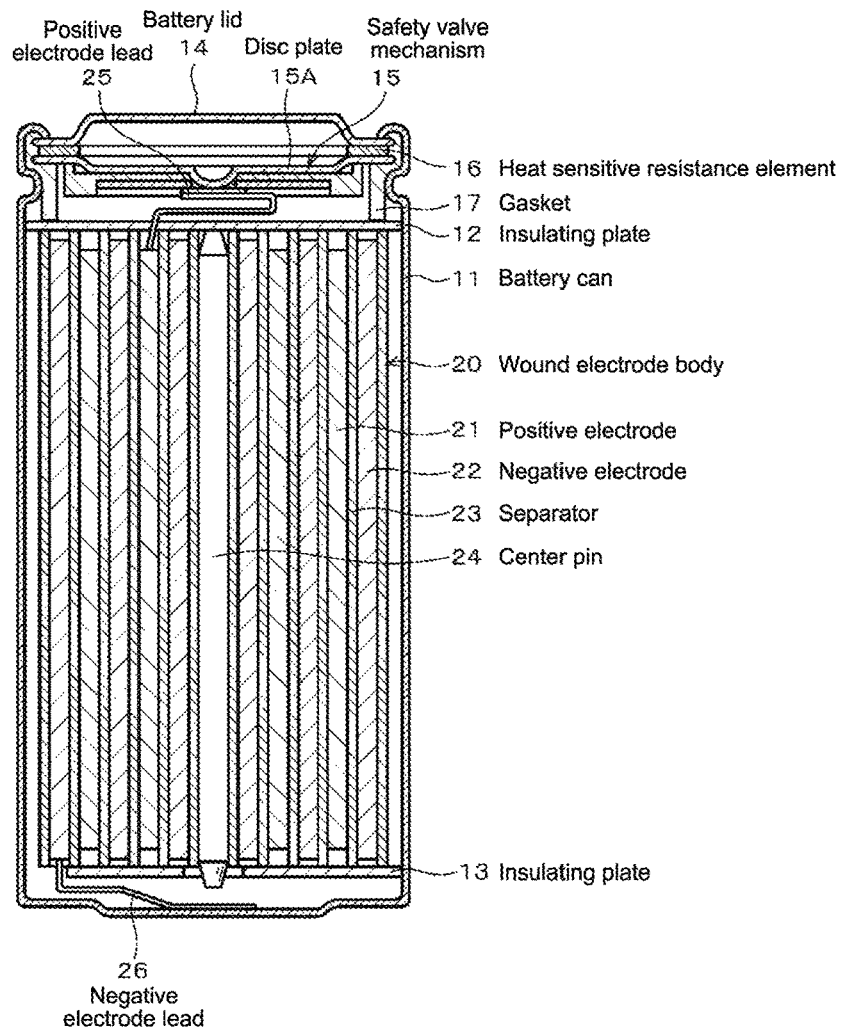
FIG. 1 is a cross-sectional view showing a configuration example of a non-aqueous electrolyte secondary battery according to a second embodiment of the present technology.

Embodiments of the present technology will be described in the following order.
1 First Embodiment (example of electrolyte solution)
2 Second Embodiment (example of cylindrical battery)
3 Third Embodiment (example of flat-type battery)
4 Fourth Embodiment (example of battery pack and electronic apparatus)
5 Fifth Embodiment (example of power storage system)
6 Sixth Embodiment (example of electric vehicle)

1 First Embodiment

[Composition of Electrolyte Solution]

An electrolyte solution that is a liquid electrolyte includes a non-aqueous solvent, an electrolyte salt, and a first additive, and the electrolyte salt is dissolved in the non-aqueous solvent. It is favorable that the electrolyte solution further contains a second additive in addition to the above-mentioned first additive.

(Solvent)

As the non-aqueous solvent, for example, ethylene carbonate (EC), propylene carbonate (PC), butylene carbonate, dimethyl carbonate (DMC), ethyl methyl carbonate (EMC), γ-butyrolactone, γ-valerolactone, 1,2-dimethoxyethane, tetrahydrofuran, 2-methyltetrahydrofuran, tetrahydropyran, 1,3-dioxolane, 4-methyl-1,3-dioxolane, 1,3-dioxane, 1,4-dioxane, acetonitrile, glutaronitrile, adiponitrile, methoxyacetonitrile, 3-methoxypropionitrile, N,N-dimethylformamide, N-methylpyrrolidinone, N-methyloxazolidinone, N,N'-dimethylimidazolidinone, nitromethane, nitroethane, sulfolane, trimethyl phosphate, dimethyl sulfoxide, and the like can be used. These may be used alone or a plurality of them may be mixed and used.

(Electrolyte Salt)

The electrolyte salt contains, for example, one or two or more kinds of lithium salts and the like described below. However, the electrolyte salt may contain another salt (e.g., a light metal salt other than the lithium salt) other than the lithium salt.

Examples of the electrolyte salt include, as a lithium salt, lithium hexafluorophosphate ($LiPF_6$), lithium tetrafluoroborate ($LiBF_4$), lithium perchlorate ($LiClO_4$), lithium hexafluoroarsenate ($LiAsF_6$), lithium tetraphenylborate ($LiB(C_6H_5)_4$), lithium bis(oxalate borate), lithium difluoro oxalate borate, lithium methanesulfonate ($LiCH_3SO_3$), lithium trifluoromethanesulfonate ($LiCF_3SO_3$), lithium bis(trifluoromethylsulfonyl) amide, lithium bis(fluoromethylsulfonyl) amide, lithium tetrachloroaluminate ($LiAlCl_4$), dilithium hexafluorosilicate ($Li_2SiF_6$), lithium chloride (LiCl), and lithium bromide (LiBr).

(First Additive)

The first additive contains at least one of compounds represented by the following formula (1) (hereinafter, referred to as "compound (1)") and compounds represented by the following formula (2) (hereinafter, referred to as "compound (2)"). Since the electrolyte solution contains the first additive, an increase in battery resistance during storage can be suppressed. It is considered that such an effect is expressed because a coating film derived from at least one of the compound (1) and the compound (2) is formed on an electrode. Note that the electrode means at least one of the positive electrode and the negative electrode.

The first additive favorably contains at least the compound (2). This is because the compound (2) is more effective in suppressing an increase in battery resistance than the compound (1). The difference in this effect is considered to be due to the fact that the electrolyte solution containing the compound (2) is superior to the electrolyte solution containing the compound (1) in the film forming ability on the electrode.

[Chem. 3]

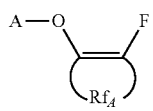
(1)

(in the formula (1), F represents a fluorine group. A represents a monovalent saturated hydrocarbon group, a monovalent unsaturated hydrocarbon group, a monovalent halogenated saturated hydrocarbon group, or a monovalent halogenated unsaturated hydrocarbon group. $Rf_A$ forms a ring and contains at least one —$CR_{A2}$— group. Note that $R_A$ represents a hydrogen group, a fluorine group, a monovalent saturated hydrocarbon group, a monovalent unsaturated hydrocarbon group, a monovalent halogenated saturated hydrocarbon group, or a monovalent halogenated unsaturated hydrocarbon group. Thus, an aromatic ring, e.g., benzene ring, is not included in the above-mentioned "ring" formed by $Rf_A$.)

[Chem. 4]

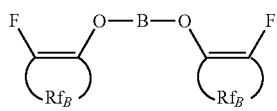
(2)

(in the formula (2), F represents a fluorine group. B represents a divalent saturated hydrocarbon group, a divalent unsaturated hydrocarbon group, a divalent halogenated saturated hydrocarbon group, or a divalent halogenated unsaturated hydrocarbon group. $Rf_B$ forms a ring and contains at least one —$CR_{B2}$— group. Note that $R_B$ represents a hydrogen group, a fluorine group, a monovalent saturated hydrocarbon group, a monovalent unsaturated hydrocarbon group, a monovalent halogenated saturated hydrocarbon group, or a monovalent halogenated unsaturated hydrocarbon group. Thus, an aromatic ring, e.g., benzene ring, is not included in the above-mentioned "ring" formed by $Rf_B$.)

The "hydrocarbon group" is a generic term for groups formed of carbon (C) and hydrogen (H), and may be linear, branched having one or more side chains, or cyclic. The "saturated hydrocarbon group" is an aliphatic hydrocarbon group having no carbon-carbon multiple bond. Note that the "aliphatic hydrocarbon group" also includes an alicyclic hydrocarbon group having a ring. The "unsaturated hydrocarbon group" is an aliphatic hydrocarbon group having a carbon-carbon multiple bond (carbon-carbon double bond or carbon-carbon triple bond).

The "halogenated saturated hydrocarbon group" represents one in which at least a part of hydrogen groups (—H) of the saturated hydrocarbon group is substituted (halogenated) with a halogen group. The halogen group includes, for example, one or two or more kinds of a fluorine group (—F), a chlorine group (—Cl), a bromine group (—Br), and an iodine group (—I). The "halogenated unsaturated hydrocarbon group" represents one in which at least a part of hydrogen groups of the unsaturated hydrocarbon group is substituted (halogenated) with a halogen group, and the kind of the halogen group is as described above.

From the viewpoint of further suppressing an increase in battery resistance during storage, A in the formula (1) is favorably a monovalent unsaturated hydrocarbon group, a monovalent halogenated saturated hydrocarbon group, or monovalent halogenated unsaturated hydrocarbon group. Since the electrolyte solution containing the compound (1) in which A is such a group has an excellent film forming ability on the electrode, the effect of suppressing an increase in battery resistance during storage is considered to be particularly high.

The larger the number of fluorine groups contained in $Rf_A$ in the formula (1), the more favorable. Specifically, the number of fluorine groups contained in $Rf_A$ is favorably not less than 2 and not more than 12, more favorably not less than 4 and not more than 12, still more favorably not less than 6 and not more than 12. This is because the larger the number of fluorine groups contained in $Rf_A$, the higher the effect of suppressing an increase in battery resistance during storage. This is considered to be because the larger the number of fluorine groups contained in $Rf_A$, the higher the insulating properties of the coating film formed on the electrode. From the viewpoint of increasing the number of fluorine groups, $Rf_A$ is favorably perfluorinated. Examples of the perfluorinated $Rf_A$ include a —$(CF_2)_m$— group. Note that m is favorably an integer of 1 to 6, more favorably 2 to 6, and still more favorably 3 to 6.

Similarly, also B in the formula (2) is favorably a divalent unsaturated hydrocarbon group or a divalent halogenated unsaturated hydrocarbon group from the viewpoint of further suppressing an increase in battery resistance during storage. Since the electrolyte solution containing the compound (2) in which B is such a group has an excellent film forming ability on the electrode, the effect of suppressing an increase in battery resistance during storage is considered to be particularly high.

The larger the number of fluorine groups contained in $Rf_B$ in the formula (2), the more favorable. Specifically, the number of fluorine groups contained in $Rf_B$ is favorably not less than 2 and not more than 12, more favorably not less than 4 and not more than 12, still more favorably not less than 6 and not more than 12. This is because the larger the number of fluorine groups contained in $Rf_B$, the higher the effect of suppressing an increase in battery resistance during storage. This is considered to be because the larger the number of fluorine groups contained in $Rf_B$, the higher the insulating properties of the coating film formed on the electrode. From the viewpoint of increasing the number of fluorine groups, $Rf_B$ is favorably perfluorinated. Examples of the perfluorinated $Rf_B$ include a —$(CF_2)_n$— group. Note that n is favorably an integer of 1 to 6, more favorably 2 to 6, and still more favorably 3 to 6.

From the viewpoint of suppressing volatilization of the electrolyte solution by increasing the molecular weight, more specifically, from the viewpoint of suppressing transpiration during leakage of the electrolyte solution, the first additive favorably contains the dimeric compound (2).

The compound (1) is, for example, at least one of compounds represented by the following formulae (1-1) to (1-10) (hereinafter, referred to as "compounds (1-1) to (1-10)").

[Chem. 5]

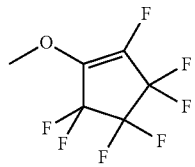 (1-1)

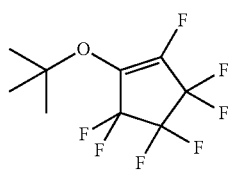 (1-2)

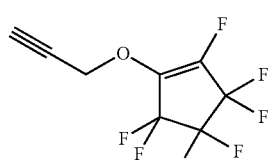 (1-3)

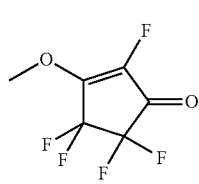 (1-4)

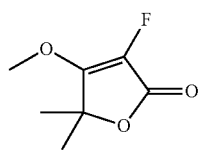 (1-5)

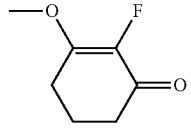 (1-6)

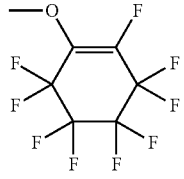 (1-7)

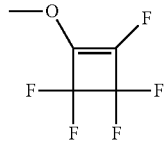 (1-8)

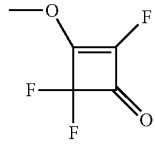 (1-9)

-continued

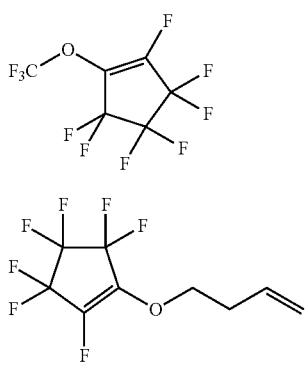

(1-10)

(1-11)

The compound (2) is, for example, at least one of compounds represented by the following formulae (2-1) to (2-3) (hereinafter, referred to as "compounds (2-1) to (2-3)").

[Chem. 6]

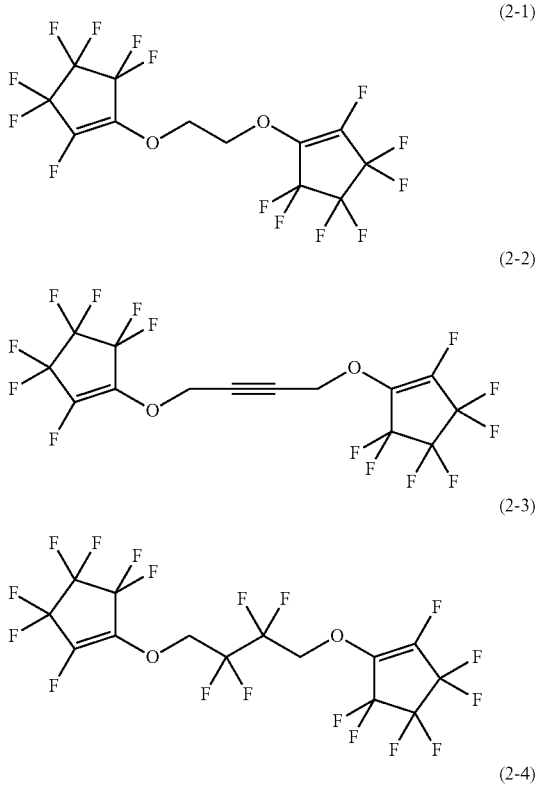

(2-1)

(2-2)

(2-3)

(2-4)

The content of the first additive in the electrolyte solution, i.e., the content of at least one of the compound (1) and the compound (2) is favorably not less than 0.01% by mass and not more than 30% by mass, and more favorably not less than 0.1% by mass and not more than 5 mass % by mass. This is because in the case where it is within the above-mentioned numerical range, the effect of suppressing an increase in battery resistance during storage is further improved. Note that the content of the first additive in the electrolyte solution means the mass percentage with respect to the total mass of the electrolyte solution.

The content of the first additive contained in the electrolyte solution of the battery can be obtained, for example, as follows. First, the battery is disassembled under an inert atmosphere such as a glove box, and the electrolyte solution component is extracted using DMC or heavy solvent. Next, the content of the first additive in the electrolyte solution is determined by performing GC-MS (Gas Chromatograph-Mass Spectrometry) measurement and NMR (Nuclear Magnetic Resonance) measurement on the obtained extract solution.

(Second Additive)

The second additive contains at least one kind selected from the group consisting of halogenated carbonic acid ester, unsaturated cyclic carbonic acid ester, sultone (cyclic sulfonic acid ester), lithium difluorophosphate (LiPF$_2$O$_2$), lithium monofluorophosphate (Li$_2$PFO$_3$), and nitrile compound. Since the electrolyte solution contains both of the first additive and the second additive, an increase in battery resistance during storage can be further suppressed. This is considered to be because the use of an electrolyte solution containing both of the first additive and the second additive results in formation of a coating film derived from both additives on the electrode.

(Halogenated Carbonic Acid Ester)

The halogenated carbonic acid ester is a carbonic acid ester containing one or more halogens as constituent elements. Examples of the halogenated carbonic acid ester include at least one of halogenated carbonic acid esters represented by the following formulae (3) and (4).

[Chem. 7]

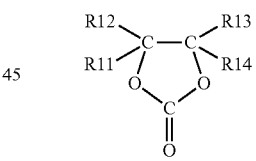

(3)

(in the formula (3), R11 to R14 each independently represent a hydrogen group, a halogen group, a monovalent hydrocarbon group, or a monovalent halogenated hydrocarbon group, and at least one of R11 to R14 is a halogen group or a monovalent halogenated hydrocarbon group.)

[Chem. 8]

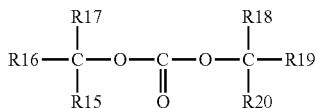

(4)

(in the formula (4), R15 to R20 each independently represent a hydrogen group, a halogen group, a monovalent hydrocarbon group, or a monovalent halogenated hydrocarbon group, and at least one of R15 to R20 is a halogen group or a monovalent halogenated hydrocarbon group.)

The halogenated carbonic acid ester represented by the formula (3) is a cyclic carbonic acid esters (halogenated cyclic carbonic acid ester) containing one or more halogens as constituent elements. The halogenated carbonic acid ester represented by the formula (4) is a chain carbonic acid ester (halogenated chain carbonic acid ester) containing one or more halogens as constituent elements.

Examples of the monovalent hydrocarbon group include an alkyl group. Examples of the monovalent halogenated hydrocarbon group include a halogenated alkyl group. Although the kind of halogen is not particularly limited, it is favorably, fluorine (F), chlorine (Cl), or bromine (Br), and more favorably, fluorine. This is because higher effects can be achieved as compared with other halogens. Note that the number of halogens is favorably two rather than one, and may be three or more. This is because the capability to form a protection film is improved and a stronger and more stable protection film is formed, thereby further suppressing the decomposition reaction of the electrolyte solution.

Examples of the halogenated cyclic carbonic acid ester represented by the formula (3) include 4-fluoro-1,3-dioxolan-2-one (FEC), 4-chloro-1,3-dioxolan-2-one, 4,5-difluoro-1,3-dioxolan-2-one, tetrafluoro-1,3-dioxolan-2-one, 4-chloro-5-fluoro-1,3-dioxolan-2-one, 4,5-dichloro-1,3-oxolan-2-one, tetrachloro-1,3-dioxolan-2-one, 4,5-bistrifluoromethyl-1,3-dioxolan-2-one, 4-trifluoromethyl-1,3-dioxolan-2-one, 4,5-difluoro-4,5-dimethyl-1,3-dioxolan-2-one, 4,4-difluoro-5-methyl-1,3-dioxolan-2-one, 4-ethyl-5,5-difluoro-1,3-dioxolan-2-one, 4-fluoro-5-trifluoromethyl-1,3-dioxolan-2-one, 4-methyl-5-trifluoromethyl-1,3-dioxolan-2-one, 4-fluoro-4,5-dimethyl-1,3-dioxolan-2-one, 5-(1,1-difluoroethyl)-4,4-difluoro-1,3-dioxolan-2-one, 4,5-dichloro-4,5-dimethyl-1,3-dioxolan-2-one, 4-ethyl-5-fluoro-1,3-dioxolan-2-one, 4-ethyl-4,5-difluoro-1,3-dioxolan-2-one, 4-ethyl-4,5,5-trifluoro-1,3-dioxolan-2-one, and 4-fluoro-4-methyl-1,3-dioxolan-2-one. These may be used alone or a plurality of kinds of them may be combined. This halogenated cyclic carbonic acid ester includes geometric isomers. For example, in the case of 4,5-difluoro-1,3-dioxolan-2-one, a trans isomer thereof is favorable than a cis isomer thereof. This is because it can be easily obtained and high effects can be achieved. Examples of the halogenated chain carbonic acid ester represented by the formula (4) include fluoromethyl methyl carbonate, bis(fluoromethyl) carbonate, and difluoromethyl methyl carbonate. These may be used alone or a plurality of kinds of them may be combined.

(Unsaturated Cyclic Carbonic Acid Ester)

The unsaturated cyclic carbonic acid ester is a cyclic carbonic acid ester containing one or more unsaturated carbon bonds (carbon-carbon double bond). Examples of the unsaturated cyclic carbonic acid ester include a compound represented by the formula (5) such as methylene ethylene carbonate (4MEC: 4-methylene-1,3-dioxolan-2-one), vinylene carbonate (VC), and vinyl ethylene carbonate.

[Chem. 9]

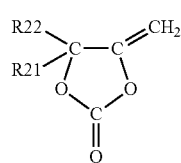

(5)

(in the formula (5), R21 and R22 each independently represent a hydrogen group, a halogen group, a monovalent hydrocarbon group, or a monovalent halogenated hydrocarbon group.)

(Sultone (Cyclic Sulfonic Acid Ester))

Examples of the sultone include a compound represented by the formula (6). Examples of the compound represented by the formula (6) include propane sultone (PS: 1,3-propane sultone) and propene sultone (PRS: 1,3-propene sultone).

[Chem. 10]

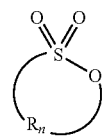

(6)

(in the formula (6), Rn is a divalent hydrocarbon group having n carbon atoms, a ring being formed by the divalent hydrocarbon group together with S (sulfur) and O (oxygen). N represents 2 to 5. The ring may contain an unsaturated double bond.)

(Nitrile Compound)

A nitrile compound only needs to be a compound having a nitrile group in the molecule, and a compound having one nitrile group, a compound having two nitrile groups, or a compound having three or more nitrile groups can be used. These may be used alone or a plurality of them may be mixed.

Examples of the compound having one nitrile group include acetonitrile, propionitrile, butyronitrile, isobutyronitrile, valeronitrile, isovaleronitrile, caprylonitrile, lauronitrile, stearylonitrile, 2-methylbutyronitrile, trimethylacetonitrile, hexanenitrile, cyclopentanecarbonitrile, cyclohexanecarbonitrile, acrylonitrile, methacrylonitrile, crotononitrile, 3-methylcrotononitrile, 2-methyl-2-butenenitrile, 2-pentenenitrile, 2-methyl-2-pentenenitrile, 3-methyl-2-pentenenitrile, 2-hexenenitrile, fluoroacetonitrile, di fluoroacetonitrile, tri fluoroacetonitrile, 2-fluoropropionitrile, 3-fluoropropionitrile, 2,2-difluoropropionitrile, 2,3-difluoropropionitrile, 3,3-difluoropropionitrile, 2,2,3-trifluoropropionitrile, 3,3,3-trifluoropropionitrile, and pentafluoropropionitrile.

Examples of the compound having two nitrile groups include malononitrile, succinonitrile, glutaronitrile, adiponitrile, pimelonitrile, suberonitrile, azelanitrile, sebaconitrile, undecane dinitrile, dodecanedinitrile, methylmalononitrile, ethylmalononitrile, isopropylmalononitrile, tert-butylmalononitrile, methylsuccinonitrile, 2,2-dimethylsuccinonitrile, 2,3-dimethylsuccinonitrile, 2,3,3-trimethylsuccinonitrile, 2,2,3,3-tetramethylsuccinonitrile, 2,3-diethyl-2,3-dimethylsuccinonitrile, 2,2-diethyl-3,3-dimethylsuccinonitrile, bicyclohexyl-1,1-dicarbonitrile, bicyclohexyl-2,2-dicarbonitrile, bicyclohexyl-3,3-dicarbonitrile, 2,5-dimethyl-2,5-hexanedicarbonitrile, 2,3-diisobutyl-2,3-dimethylsuccinonitrile, 2,2-diisobutyl-3,3-dimethylsuccinonitrile, 2-methylglutaronitrile, 2,3-dimethylglutaronitrile, 2,4-dimethylglutaronitrile, 2,2,3,3-tetramethylglutaronitrile, 2,2,4,4-tetramethylglutaronitrile, 2,2,3,4-tetramethylglutaronitrile, 2,3,3,4-tetramethylglutaronitrile, maleonitrile, fumaronitrile, 1, 4-dicyanopentane, 2,6-dicyanoheptane, 2,7-dicyanooctane, 2,8-dicyanononane, 1, 6-dicyanodecane, 1,2-dicyanobenzene, 1,3-dicyanobenzene, 1,4-dicyanobenzene, 3,3'-(ethylenedioxy) dipropionitrile, 3,3'-(ethylenedithio) dipropionitrile, 3,3'-oxydipropionitrile, and 3,3'-thiodipropionitrile.

Examples of the compound having three or more nitrile groups include 1,2,3-propanetricarbonitrile, 1,3,5-pentanetricarbonitrile, 1,3,6-hexanetricarbonitrile, 1,2,3-tris(2-cyanoethoxy) propane, tris(2-cyanoethyl) amine, 1,3,5-cyclohexanetricarbonitrile, 7,7,8,8-tetracyanoquinodimethane, 2,5-dimethyl-7,7,7,8-tetracyanoquinodimethane, 2,5-difluoro-7,7,8,8-tetracyanoquinodimethane, and polyacrylonitrile.

[Effects]

The electrolyte solution according to the first embodiment contains at least one of the compound (1) and the compound (2) as the first additive. By using this electrolyte solution for a battery such as a lithium ion secondary battery, it is possible to suppress an increase in battery resistance during storage.

2 Second Embodiment

In a second embodiment, a non-aqueous electrolyte secondary battery including the above-mentioned electrolyte solution according to the first embodiment will be described.

[Configuration of Battery]

Hereinafter, a configuration example of a non-aqueous electrolyte secondary battery according to the second embodiment of the present technology will be described with reference to FIG. 1. This non-aqueous electrolyte secondary battery is, for example, a so-called lithium ion secondary battery in which the capacity of the negative electrode is represented by a capacity component due to absorption and release of lithium (Li) that is an electrode reactive material. This non-aqueous electrolyte secondary battery is a so-called cylindrical type battery, and has a wound electrode body 20 in which a pair of a strip-shaped positive electrode 21 and a strip-shaped negative electrode 22 is laminated and wound via a separator 23 in a substantially hollow cylindrical battery can 11. The battery can 11 is formed of iron (Fe) plated with nickel (Ni), one end thereof is closed, and the other end is opened. An electrolyte solution as an electrolyte is injected into the battery can 11, and impregnated in the positive electrode 21, the negative electrode 22, and the separator 23. Further, a pair of insulating plates 12 and 13 is disposed vertical to the winding peripheral surface so as to sandwich the wound electrode body 20.

To the open end of the battery can 11, a battery lid 14, and a safety valve mechanism 15 and a heat sensitive resistance element (Positive Temperature Coefficient; PTC element) 16 provided inside this battery lid 14 are caulked via a sealing gasket 17 and attached. As a result, the inside of the battery can 11 is hermetically sealed. The battery lid 14 is formed of, for example, a material similar to that of the battery can 11. The safety valve mechanism 15 is electrically connected to the battery lid 14. In the safety valve mechanism 15, in the case where the internal pressure of the battery is not less than a certain level due to internal short circuit, heat from the outside, and the like, a disc plate 15A turns over and electrical connection between the battery lid 14 and the wound electrode body 20 is cut off. The sealing gasket 17 is formed of, for example, an insulating material, and, asphalt is applied to the surface of the gasket 17.

For example, a center pin 24 is inserted in the center of the wound electrode body 20. A positive electrode lead 25 formed of aluminum (Al) or the like is connected to the positive electrode 21 of the wound electrode body 20, and a negative electrode lead 26 formed of nickel or the like is connected to the negative electrode 22. The positive electrode lead 25 is welded to the safety valve mechanism 15 so as to be electrically connected to the battery lid 14, and the negative electrode lead 26 is welded to the battery can 11 and electrically connected thereto.

Figure 2:
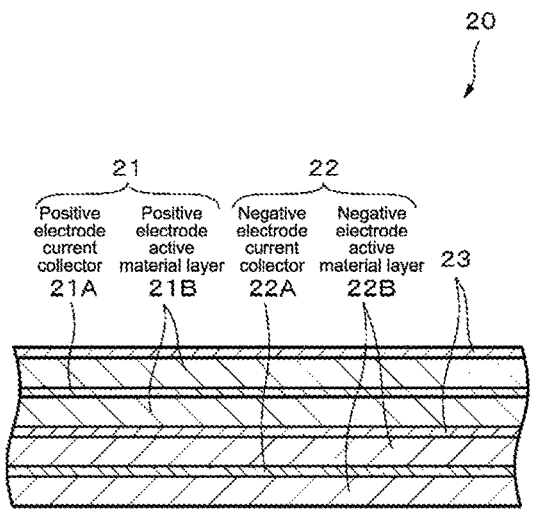
FIG. 2 is an enlarged cross-sectional view showing a part of a wound electrode body shown in FIG. 1.

Hereinafter, the positive electrode 21, the negative electrode 22, the separator 23, and the electrolyte solution constituting the non-aqueous electrolyte secondary battery will be sequentially described with reference to FIG. 2.

(Positive Electrode)

The positive electrode 21 has a structure in which a positive electrode active material layer 21B is provided on both surfaces of a positive electrode current collector 21A, for example. Note that although not shown, the positive electrode active material layer 21B may be provided only on one side of the positive electrode current collector 21A. The positive electrode current collector 21A is formed of a metal foil such as an aluminum foil, a nickel foil, and a stainless steel foil. The positive electrode active material layer 21B includes, for example, a positive electrode active material capable of absorbing and releasing lithium ions that are electrode reactive materials. The positive electrode active material layer 21B may further contain an additive as necessary. As the additive, for example, at least one of a conductive agent and a binding agent can be used.

As the positive electrode materials capable of absorbing and releasing lithium ions, lithium-containing compounds such as lithium oxide, lithium phosphorus oxide, lithium sulfide, and an interlayer compound containing lithium are appropriate, and two or more of them may be mixed and used. In order to increase the energy density, a lithium-containing compound containing lithium, a transition metal element, and oxygen (O) is favorable. Examples of such a lithium-containing compound include lithium composite oxide that has a layered rock salt type structure and is represented by the formula (A) and lithium composite phosphate that has an olivine type structure and is represented by the formula (B). As the lithium-containing compound, those containing, as a transition metal element, at least one of elements selected from the group consisting of cobalt (Co), nickel, manganese (Mn), and iron are more favorable. Examples of such a lithium-containing compound include lithium composite oxide that has a layered rock salt type structure and is represented by the formula (C), the formula (D), or the formula (E), lithium composite oxide that has a spinel type structure and is represented by the formula (F), lithium composite phosphate that has an olivine type structure and is represented by the formula (G), and specifically, $LiNi_{0.50}Co_{0.20}Mn_{0.30}O_2$, $Li_aCoO_2(a\approx1)$, $Li_bNiO_2(b\approx1)$, $Li_{c1}Nic_2Co_{1-c2}O_2(c1\approx1, 0<c2<1)$, $LidMn_2O_4(d\approx1)$, and $LieFePO_4(e\approx1)$.

(Formula A)

$$Li_pNi_{(1-a-r)}Mn_aM1_rO_{(2-y)}X_z \quad (A)$$

(in the formula (A), M1 represents at least one of elements selected from group 2 elements to group 15 elements other than nickel and manganese. X represents at least one of group 16 elements and group 17 elements other than oxygen. p, q, y, and z represent values satisfying the following relationships, $0 \leq p \leq 1.5$, $0 \leq q \leq 1.0$, $0 \leq r \leq 1.0$, $-0.10 \leq y \leq 0.20$, and $0 \leq z \leq 0.2$)

(Formula B)

$$Li_aM2_bPO_4 \quad (B)$$

(in the formula (B), M2 represents at least one of elements selected from group 2 elements to group 15 elements. a and b represent values satisfying the following relationships, 0≤a≤2.0 and 0.5≤b≤2.0.)

(Formula C)

$$Li_jMn_{(1-g-h)}Ni_gM3_hO_{(2-j)}F_k \quad (C)$$

(in the formula (C), M3 represents at least one of elements selected from the group consisting of cobalt, magnesium (Mg), aluminum, boron (B), titanium (Ti), vanadium (V), chromium (Cr), iron, copper (Cu), zinc (Zn), zirconium (Zr), molybdenum (Mo), tin (Sn), calcium (Ca), strontium (Sr), and tungsten (W). f, g, h, j, and k represent values satisfying the following relationships, 0.8≤f≤1.2, 0<g<0.5, 0≤h≤0.5, g+h<1, −0.1≤j≤0.2, and 0≤k≤0.1. Note that the composition of lithium is different depending on the state of charge and discharge, and the value of f represents a value in the complete discharge state.)

(Formula D)

$$Li_mNi_{(1-n)}M4_nO_{(2-n)}F_q \quad (D)$$

(in the formula (D), M4 represents at least one of elements selected from the group consisting of cobalt, manganese, magnesium, aluminum, boron, titanium, vanadium, chromium, iron, copper, zinc, molybdenum, tin, calcium, strontium, and tungsten. m, n, p, and q represent values satisfying the following relationships, 0.8≤m≤1.2, 0.005≤n≤0.5, −0.1≤p≤0.2, and 0≤q≤0.1. Note that the composition of lithium is different depending on the state of charge and discharge, and the value of m represents a value in the complete discharge state.)

(Formula E)

$$Li_rCo_{(1-n)}M5_sO_{(2-t)}F_u \quad (E)$$

(in the formula (E), M5 represents at least one of elements selected from the group consisting of nickel, manganese, magnesium, aluminum, boron, titanium, vanadium, chromium, iron, copper, zinc, molybdenum, tin, calcium, strontium, and tungsten. r, s, t, and u represent values satisfying the following relationships, 0.8≤r≤1.2, 0≤s<0.5, −0.1≤t≤0.2, and 0≤u≤0.1. Note that the composition of lithium is different depending on the state of charge and discharge, and the value of r represents a value in the complete discharge state.)

(Formula F)

$$Li_vMn_{2-w}M6_wO_xF_y \quad (F)$$

(in the formula (F), M6 represents at least one of elements selected from the group consisting of cobalt, nickel, magnesium, aluminum, boron, titanium, vanadium, chromium, iron, copper, zinc, molybdenum, tin, calcium, strontium, and tungsten. v, w, x, and y represent values satisfying the following relationships, 0.9≤v≤1.1, 0≤w≤0.6, 3.7≤x≤4.1, and 0≤y≤0.1. Note that the composition of lithium is different depending on the state of charge and discharge, and the value of v represents a value in the complete discharge state.)

(Formula G)

$$Li_zM7PO_4 \quad (G)$$

(in the formula (G), M7 represents at least one of elements selected from the group consisting of cobalt, manganese, iron, nickel, magnesium, aluminum, boron, titanium, vanadium, niobium (Nb), copper, zinc, molybdenum, calcium, strontium, tungsten, and zirconium. z represents a value satisfying the following relationship, 0.9≤z≤1.1. Note that the composition of lithium is different depending on the state of charge and discharge, and the value of z represents a value in the complete discharge state.)

Other examples of the positive electrode material capable of absorbing and releasing lithium ions include inorganic compounds containing no lithium such as $MnO_2$, $V_2O_5$, $V_6O_{13}$, NiS, and MoS.

The positive electrode material capable of absorbing and releasing lithium ions may be other than the above. Further, two or more kinds of the positive electrode materials exemplified above may be mixed in arbitrary combination.

As the binding agent, for example, at least one kind selected from resin materials such as polyvinylidene fluoride (PVdF), polytetrafluoroethylene (PTFE), polyacrylonitrile (PAN), styrene butadiene rubber (SBR), and carboxymethyl cellulose (CMC), and copolymers mainly formed of these resin materials is used.

Examples the conductive agent include carbon materials such as graphite, carbon black, and Ketchen black, and one or two or more kinds thereof are used in mixture. Further, besides the carbon material, a metal material, a conductive polymer material, or the like may be used as long as it has conductivity.

(Negative Electrode)

The negative electrode 22 has a structure in which a negative electrode active material layer 22B is provided on both surfaces of a negative electrode current collector 22A, for example. Note that although not shown, the negative electrode active material layer 22B may be provided only on one side of the negative electrode current collector 22A. The negative electrode current collector 22A is formed of, for example, a metal foil such as a copper foil, a nickel foil, and a stainless steel foil.

The negative electrode active material layer 22B contains one or two or more kinds of negative electrode active materials capable of absorbing and releasing lithium ions. The negative electrode active material layer 22B may further contain additives such as a binding agent and a conductive agent as necessary.

Note that in this non-aqueous electrolyte battery, the electrochemical equivalent of the negative electrode 54 or the negative electrode active material is larger than the electrochemical equivalent of the positive electrode 21, and theoretically, it is favorable that lithium metal does not precipitate on the negative electrode 22 during charging.

Examples of the negative electrode active material include carbon materials such as non-graphitizable carbon, easily graphitizable carbon, graphite, pyrolytic carbons, cokes, glassy carbons, baked organic polymer compounds, carbon fiber, and activated carbon. Examples of cokes in these materials include pitch coke, needle coke, and petroleum coke. The baked organic polymer compounds are materials in which a polymer material such as phenolic resin and furan resin is baked at appropriate temperatures and carbonized. Some of the baked organic polymer compounds can also be classified as non-graphitizable carbon, or easily graphitizable carbon. These carbon materials are favorable because possible changes in crystal structure of such materials in charging and discharging are very small, and high charge-discharge capacity and good cycle characteristics can be achieved. In particular, graphite is favorable because of its large electrochemical equivalent and capability of providing high energy density. Further, non-graphitizable carbon is favorable because of its capability of providing excellent cycle characteristics. Further, the carbon materials that show low charge-discharge potential, specifically, those that show charge-discharge potential close to that shown by lithium metal is favorable because such materials make it easier to realize high energy density of the battery.

Further, examples of another negative electrode active material capable of increasing the capacity include a material that contains at least one of a metal element and a metalloid element as a constituent element (e.g., an alloy, a compound, or mixture). This is because high energy density can be achieved when this kind of material is used. In particular, it is more favorable to use such a material together with a carbon material because high energy density and also excellent cycle characteristics can be achieved. Note that in the present technology, the term "alloy" encompasses alloys containing two or more kinds of metal elements, and also alloys containing one or more kinds of metal elements and one or more kinds of metalloid elements. Further, these alloys may also contain non-metal elements. Tissues of these alloys include a solid solution, a eutectic crystal (eutectic mixture), or an intermetallic compound, and two or more thereof may coexist.

Examples of such a negative electrode active material include metal elements and metalloid elements that are capable of forming an alloy with lithium. Specific examples of the metal elements and metalloid elements include magnesium, boron, aluminum, titanium, gallium (Ga), indium (In), silicon (Si), germanium (Ge), tin, lead (Pb), bismuth (Bi), cadmium (Cd), silver (Ag), zinc, hafnium (Hf), zirconium, yttrium (Y), palladium (Pd), and platinum (Pt). These materials may be crystalline or amorphous.

Favorably, the negative electrode active material may be one that contains a metal element or a metalloid element belonging to group 4B in the short form periodic table as a constituent element. One that contains at least one of silicon and tin as a constituent element is more favorable. This is because silicon and tin have high capability for absorbing and releasing lithium and high energy density can be achieved. Examples of such a negative electrode active material include a single substance, an alloy, and a compound of silicon, a single substance, an alloy, and a compound of tin, and a material that includes one or more of these forms at least in a portion thereof.

Examples of alloys of silicon include an alloy containing, as its second constituent element other than silicon, at least one of elements selected from the group consisting of tin, nickel, copper, iron, cobalt, manganese, zinc, indium, silver, titanium, germanium, bismuth, antimony (Sb), and chromium. Examples of alloys of tin include an alloy containing, as its second constituent element other than tin, at least one of elements selected from the group consisting of silicon, nickel, copper, iron, cobalt, manganese, zinc, indium, silver, titanium, germanium, bismuth, antimony, and chromium.

Examples of compounds of tin or compounds of silicon include a compound that contains oxygen or carbon. Such compounds may also contain, in addition to tin or silicon, any of the second constituent elements described above.

Among these materials, a SnCoC-containing material that contains cobalt, tin, and carbon as constituent elements, in which the content of carbon is not less than 9.9% by mass and not more than 29.7% by mass and the proportion of cobalt of the sum of tin and cobalt is not less than 30% by mass and not more than 70% by mass, is favorable as the Sn-based negative electrode active material. This is because high energy density and excellent cycle characteristics can be achieved in such a composition range.

The SnCoC-containing material may further contain other constituent elements as necessary. As these other constituent elements, for example, silicon, iron, nickel, chromium, indium, niobium, germanium, titanium, molybdenum, aluminum, phosphorus (P), gallium, and bismuth are favorable, and two or more thereof may be contained. This is because capacitance characteristics or cycle characteristics can be further improved.

Note that it is favorable that the SnCoC-containing material has a phase containing tin, cobalt, and carbon, in which the phase has a low crystallized or amorphous structure. Further, in the SnCoC-containing material, it is favorable that at least a part of carbon as the constituent element is bound to a metal element or a metalloid element as the other constituent element. This is because lowering of cycle characteristics may be due to aggregation or crystallization of tin or the like, and carbon is bound to other elements, making it possible to suppress such aggregation or crystallization.

Examples of measurement methods for examining the binding state of elements include X-ray photoelectron spectroscopy (XPS). In this XPS, so far as graphite is concerned, a peak of the 1s orbit of carbon (C1s) appears at 284.5 eV in an energy-calibrated apparatus such that a peak of the 4f orbit of a gold atom (Au4f) is obtained at 84.0 eV. Also, so far as surface-contaminated carbon is concerned, it appears at 284.8 eV. Meanwhile, when a charge density of the carbon element is high, for example, when carbon is bound to a metal element or a metalloid element, the peak of C1s appears in a lower region than 284.5 eV. That is, when a peak of a combined wave of C1s obtained on the SnCoC-containing material appears in a lower region than 284.5 eV, at least a part of carbon contained in the SnCoC-containing material is bound to a metal element or a metalloid element as other constituent element.

Note that in the XPS measurement, for example, the peak of C1s is used for correcting the energy axis of a spectrum. In most cases, because there is some surface-contaminated carbon present in the surface, the peak of C1s of the surface-contaminated carbon can be fixed at 284.8 eV, and this peak can be used as an energy reference. In the XPS measurement, because a waveform of the peak of C1s can be obtained as a form that includes both the peak of the surface-contaminated carbon and the peak of carbon from the SnCoC-containing material, for example, through an analysis using commercial software programs, the peak of the surface-contaminated carbon and the peak of the carbon from the SnCoC-containing material can be separated from each other. In the analysis of the waveform, the position of a main peak existing closer to the lowest binding energy is used as an energy reference (284.8 eV).

Examples of another negative electrode active material include metal oxides and polymer compounds, each of which is capable of absorbing and releasing lithium. Examples of the metal oxides include, lithium titanium oxide containing lithium and titanium such as lithium titanate ($Li_4Ti_5O_{12}$), iron oxide, ruthenium oxide, and molybdenum oxide. Examples of the polymer compounds include polyacetylene, polyaniline, and polypyrrole.

As the binding agent, for example, at least one kind selected from resin materials such as polyvinylidene fluoride, polytetrafluoroethylene, polyacrylonitrile, styrene butadiene rubber, and carboxymethyl cellulose, a copolymer mainly formed of these resin materials, and the like, is used. As the conductive agent, a material similar to that of the positive electrode active material layer 21B, or the like can be used.

(Separator)

The separator 23 isolates the positive electrode 21 and the negative electrode 22, and allows lithium ions to pass while preventing short-circuiting of current caused by contact between the both electrodes. The separator 23 includes a porous film formed of resin such as polytetrafluoroethylene, polypropylene, and polyethylene, and may have a structure in which two or more of these porous films are laminated. Among them, a porous film formed of polyolefin is favorable because it has an excellent short circuit prevention effect and is capable of improving battery safety due to a shutdown effect. In particular, polyethylene is favorable as a material constituting the separator 23 because it is capable of achieving shutdown effect within a range of not less than 100° C. and not more than 160° C. and has excellent electrochemical stability. In addition, a material obtained by copolymerizing or blending resin having chemical stability with polyethylene or polypropylene can be used. Alternatively, the porous film may have a structure of three or more layers in which a polypropylene layer, a polyethylene layer, and a polypropylene layer are sequentially laminated.

Further, in the separator 23, a resin layer may be provided on one side or both sides of a porous film that is a base material. The resin layer is a porous matrix resin layer carrying an inorganic material. As a result, oxidation resistance can be achieved, and deterioration of the separator 23 can be suppressed. As the matrix resin, for example, polyvinylidene fluoride, hexafluoropropylene (HFP), polytetrafluoroethylene, or the like can be used, and copolymers of them can also be used.

Examples of the inorganic material include metals, semiconductors, and oxides and nitrides of these materials. Examples of the metal include aluminum and titanium, and examples of the semiconductor include silicon and boron. Further, as the inorganic material, one having substantially no conductivity and a large heat capacity is favorable. This is because when the heat capacity is large, it is useful as a heat sink at the time of heat generation by current and it is possible to suppress the thermal runaway of the battery more. Examples of such inorganic materials include oxides or nitrides of alumina ($Al_2O_3$), boehmite (monohydrate of alumina), talc, boron nitride (BN), aluminum nitride (AlN), titanium dioxide ($TiO_2$), silicon oxide (SiOx), and the like.

The particle diameter of the inorganic material is favorably in the range of 1 nm to 10 μm. In the case where it is smaller than 1 nm, it is difficult to obtain, and even if it is available, it is not suitable for cost. In the case where it is larger than 10 μm, the distance between the electrodes becomes large, so that the filing amount of active materials cannot be sufficiently ensured in limited space and the battery capacity becomes low.

As a method of forming the resin layer, for example, the resin layer can be formed by applying a slurry including matrix resin, a solvent, and an inorganic material to a base material (porous film), causing it to pass through a poor solvent of the matrix resin and a parent solvent bath of the above-mentioned solvent to cause phase separation, and then drying it.

Further, the piercing strength of the separator 23 is favorably in the range of 100 gf to 1000 gf. More favorably, it is in the range of 100 gf to 480 gf. This is because a short circuit may occur in the case where the piercing strength is low, and the ion conductivity is reduced in the case where the piercing strength is high.

Further, the air permeability of the separator 23 is favorably in the range of 30 sec/100 cc to 1000 sec/100 cc. More favorably, it is in the range of 30 sec/100 cc to 680 sec/100 cc. This is because a short circuit may occur in the case where the air permeability is low, and the ion conductivity is reduced in the case where the air permeability is high.

Note that the above-mentioned inorganic material may be contained in a porous film as a base material.

(Electrolyte Solution)

An electrolyte solution is one according to the first embodiment described above.

[Battery Voltage]

For this non-aqueous electrolyte battery, an open circuit voltage (i.e., battery voltage) at the time of complete charge may be set to, for example, not less than 2.80 V and not more than 6.00 V, not less than 3.60 V and not more than 6.00 V, favorably not less than 4.25 V and not more than 6.00 V, not less than 4.20 V and not more than 4.50 V, more favorably not less than 4.30 V and not more than 4.55 V. In the case where the open circuit voltage at the time of complete charge is set to not less than 4.25 V in a battery using a layered rock salt type lithium composite oxide or the like as the positive electrode active material, because the amount of lithium released per unit mass increases even with the same positive electrode active material as compared with a battery with the open circuit voltage of 4.20 V, the amounts of the positive electrode active material and the negative electrode active material are adjusted depending thereon, thereby obtaining a high energy density.

[Operation of Battery]

In the non-aqueous electrolyte secondary battery having the above-mentioned configuration, when charging is performed, for example, lithium ions are released from the positive electrode active material layer 21B and absorbed in the negative electrode active material layer 22B via the electrolyte solution. Further, when discharging is performed, for example, lithium ions are released from the negative electrode active material layer 22B and absorbed in the positive electrode active material layer 21B via the electrolyte solution.

[Method of Producing Battery]

Next, an example of a method of producing the non-aqueous electrolyte secondary battery according to the second embodiment of the present technology will be described.

First, for example, a positive electrode mixture is prepared by mixing a positive electrode active material, a conductive agent, and a binding agent, and the obtained positive electrode mixture is dispersed in a solvent such as N-methyl-2-pyrrolidone (NMP), thereby preparing a paste-like positive electrode mixture slurry. Next, this positive electrode mixture slurry is applied to the positive electrode current collector 21A, the solvent is dried, and compression-molding is performed by a roll press machine or the like to form the positive electrode active material layer 21B, thereby forming the positive electrode 21.

Further, for example, a negative electrode active material and a binding agent are mixed to prepare a negative electrode mixture, and this negative electrode mixture is dispersed in a solvent such as N-methyl-2-pyrrolidone to prepare a paste-like negative electrode mixture slurry. Next, this negative electrode mixture slurry is applied to the negative electrode current collector 22A, the solvent is dried, and compression-molding is performed by a roll press machine or the like to form the negative electrode active material layer 22B, thereby forming the negative electrode 22.

Next, the positive electrode lead 25 is attached to the positive electrode current collector 21A by welding or the like, and the negative electrode lead 26 is attached to the negative electrode current collector 22A by welding or the like. Next, the positive electrode 21 and the negative electrode 22 are wound via the separator 23. Next, the tip portion of the positive electrode lead 25 is welded to the safety valve mechanism 15, the tip portion of the negative electrode lead 26 is welded to the battery can 11, and the wound positive electrode 21 and the wound negative electrode 22 are sandwiched between the pair of insulating plates 12 and 13 and housed inside the battery can 11. Next, after the positive electrode 21 and the negative electrode 22 are housed inside the battery can 11, an electrolyte solution is injected into the inside of the battery can 11 and impregnated into the separator 23. Next, the battery lid 14, the safety valve mechanism 15, and the heat sensitive resistance element 16 are caulked via the sealing gasket 17 to be fixed to the opening end portion of the battery can 11. Thus, the secondary battery shown in FIG. 2 is obtained.

3. Third Embodiment

[Configuration of Battery]

Figure 3:
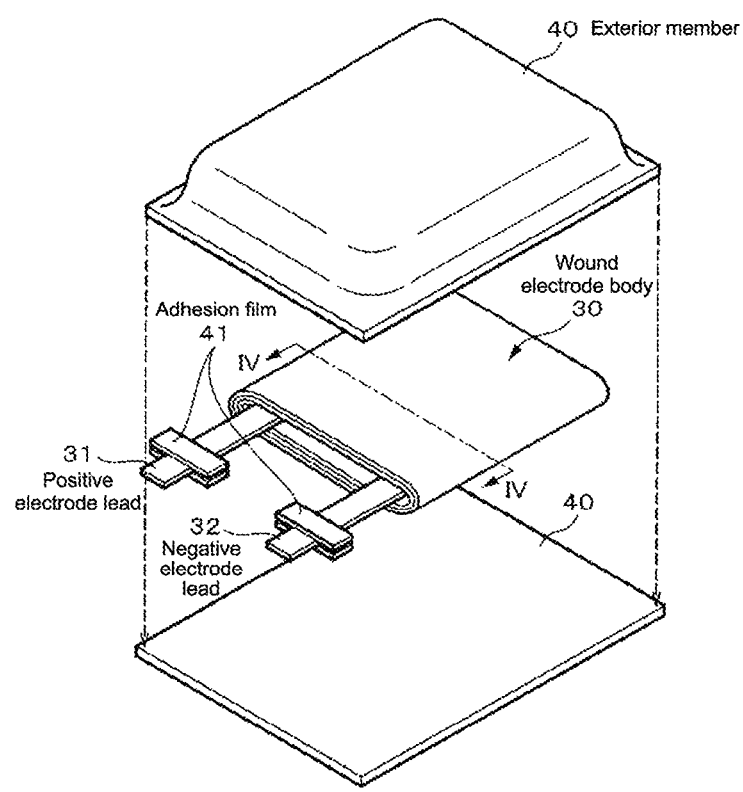
FIG. 3 is an exploded perspective view showing a configuration example of a non-aqueous electrolyte secondary battery according to a third embodiment of the present technology.

FIG. 3 is an exploded perspective view showing a configuration example of a non-aqueous electrolyte secondary battery according to a third embodiment of the present technology. This non-aqueous electrolyte secondary battery is a so-called flat type battery or square type battery, in which a wound electrode body 30 to which a positive electrode lead 31 and a negative electrode lead 32 are attached is housed inside a film-like exterior member 40, making it possible to reduce the size, weight, and thickness thereof.

The positive electrode lead 31 and the negative electrode lead 32 are led out from the inside of the exterior member 40 to the outside in the same direction, for example. Each of the positive electrode lead 31 and the negative electrode lead 32 is formed of a metal material such as aluminum, copper, nickel, and stainless steel, and has a thin plate shape or a mesh shape.

The exterior member 40 includes, for example, a rectangular aluminum laminated film obtained by laminating a nylon film, an aluminum foil, and a polyethylene film in the stated order. The exterior member 40 is disposed so that, for example, the polyethylene film side and the wound electrode body 30 are opposed to each other, and outer edge portions thereof are brought into close contact with each other by fusion or an adhesive agent. Between the exterior member 40 and the positive electrode lead 31 and the negative electrode lead 32, an adhesion film 41 for preventing the intrusion of outside air is inserted. The adhesion film 41 is formed of a material having adhesiveness to the positive electrode lead 31 and the negative electrode lead 32, e.g., polyolefin resin such as polyethylene, polypropylene, modified polyethylene, and modified polypropylene.

Note that the exterior member 40 may be formed of a laminated film having another structure, a polymer film such as polypropylene, or a metal film, instead of the aluminum laminated film described above. Alternatively, a laminated film obtained by laminating a polymer film on one side or both sides of an aluminum film serving as a core material may be used.

Figure 4:
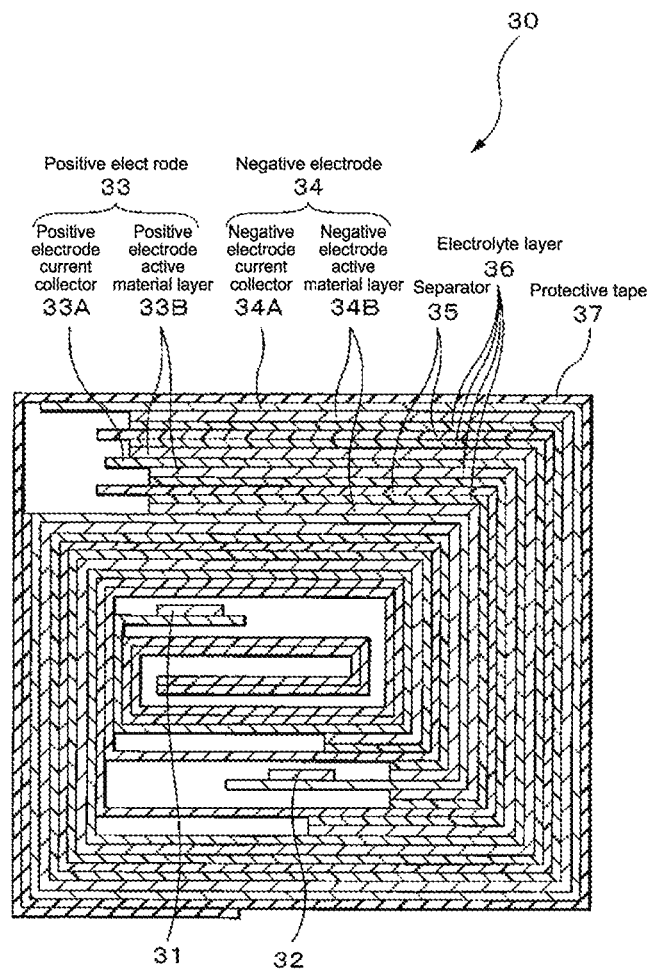
FIG. 4 is a cross-sectional view taken along the line IV-IV of a wound electrode body shown in FIG. 3.

FIG. 4 is a cross-sectional view taken along the line IV-IV of the wound electrode body 30 shown in FIG. 3. The wound electrode body 30 is obtained by laminating and winding a positive electrode 33 and a negative electrode 34 via a separator 35 and an electrolyte layer 36, and the outermost peripheral portion thereof is protected by a protective tape 37.

The positive electrode 33 has a structure in which a positive electrode active material layer 33B is provided on one side or both sides of a positive electrode current collector 33A. The negative electrode 34 has a structure in which a negative electrode active material layer 34B is provided on one side or both sides of a negative electrode current collector 34A, and is disposed so that the negative electrode active material layer 34B and the positive electrode active material layer 33B face each other. The configurations of the positive electrode current collector 33A, the positive electrode active material layer 33B, the negative electrode current collector 34A, the negative electrode active material layer 34B, and the separator 35 are similar to those of the positive electrode current collector 21A, the positive electrode active material layer 21B, the negative electrode current collector 22A, the negative electrode active material layer 22B, and the separator 23 according to the second embodiment, respectively.

The electrolyte layer 36 contains an electrolyte solution and a polymer compound serving as a holding body for holding this electrolyte solution, and is in a so-called gel state. The gel electrolyte layer 36 is favorable because it is possible to achieving high ion conductivity and preventing leakage of the battery. The electrolyte solution is the electrolyte solution according to the first embodiment. Examples of the polymer compound include polyacrylonitrile, polyvinylidene fluoride, a copolymer of vinylidene fluoride and hexafluoropropylene, polytetrafluoroethylene, polyhexafluoropropylene, polyethylene oxide, polypropylene oxide, polyphosphazene, polysiloxane, polyvinyl acetate, polyvinyl alcohol, polymethylmethacrylate, polyacrylic acid, polymethacrylic acid, styrene-butadiene rubber, nitrile-butadiene rubber, polystyrene, and polycarbonate. In particular, from the viewpoint of electrochemical stability, polyacrylonitrile, polyvinylidene fluoride, polyhexafluoropropylene, or polyethylene oxide is favorable.

Note that the inorganic material similar to the inorganic material described in the description of the resin layer of the separator 23 in the second embodiment may be contained in the gel electrolyte layer 36. This is because heat resistance can be further improved.

[Method of Producing Battery]

Next, an example of a method of producing a non-aqueous electrolyte secondary battery according to a third embodiment of the present technology will be described.

First, a precursor solution containing a solvent, an electrolyte salt, a polymer compound, and a mixed solvent is applied to each of the positive electrode 33 and the negative electrode 34, and the mixed solvent is volatilized to form the electrolyte layer 36. Next, the positive electrode lead 31 is attached to the end portion of the positive electrode current collector 33A by welding, and the negative electrode lead 32 is attached to the end portion of the negative electrode current collector 34A by welding. Next, after the positive electrode 33 and the negative electrode 34 on which the electrolyte layer 36 is formed are laminated via the separator 35 to form a laminated body, this laminated body is wound in the longitudinal direction, and the protective tape 37 is adhered to the outermost peripheral portion to form the wound electrode body 30. Finally, for example, the wound electrode body 30 is sandwiched between the exterior members 40, and the outer edge portions of the exterior members 40 are brought into close contact with each other by thermal fusion or the like and sealed. At that time, the adhesion film 41 is inserted between the positive electrode lead 31 and the negative electrode lead 32 and the exterior member 40. Thus, the secondary battery shown in FIG. 4 and FIG. 4 is obtained.

Alternatively, this secondary battery may be produced as follows. First, the positive electrode 33 and the negative electrode 34 are prepared as described above, and the positive electrode lead 31 and the negative electrode lead 32 are attached to the positive electrode 33 and the negative electrode 34. Next, the positive electrode 33 and the negative electrode 34 are laminated via the separator 35 and wound, and the protective tape 37 is adhered to the outermost peripheral portion to form a wound body. Next, this wound body is sandwiched between the exterior members 40, and the outer peripheral edge portion excluding one side is thermally fused to be shaped like a bag and housed inside the exterior member 40. Next, a composition for an electrolyte containing a solvent, an electrolyte salt, a monomer as a raw material for a polymer compound, a polymerization initiator, and, if necessary, other materials such as a polymerization inhibitor, is prepared and injected into the exterior member 40.

Next, after injecting the composition for electrolyte into the exterior member 40, the opening of the exterior member 40 is thermally fused and sealed in a vacuum atmosphere. Next, heat is applied to polymerize the monomer to obtain a polymer compound, thereby forming the gel electrolyte layer 36. Thus, the secondary battery shown in FIG. 4 is obtained.

4. Fourth Embodiment

In a fourth embodiment, a battery pack and an electronic apparatus including the non-aqueous electrolyte secondary battery according to the second or third embodiment will be described.

[Configuration of Battery Pack and Electronic Apparatus]

Figure 5:
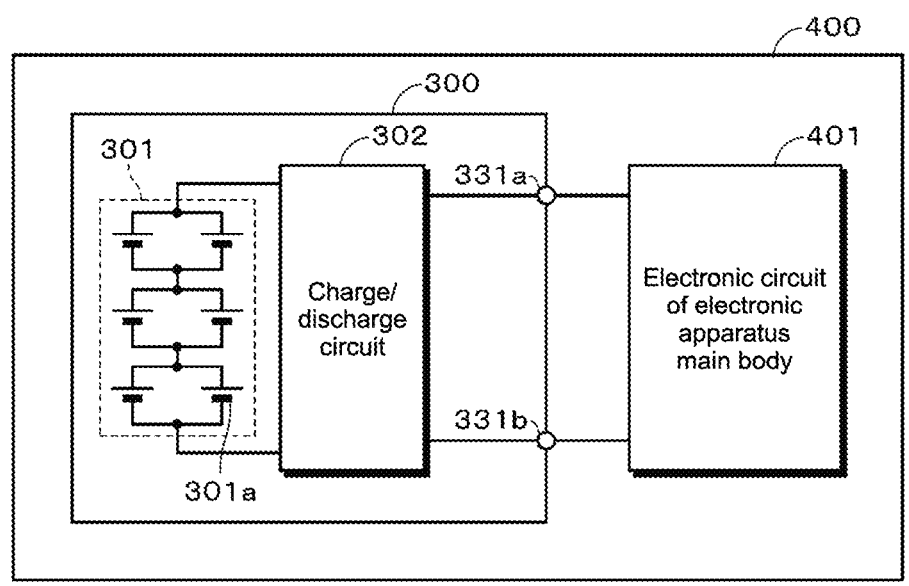
FIG. 5 is a block diagram showing a configuration example of a battery pack and an electronic apparatus according to a fourth embodiment of the present technology.

Hereinafter, a configuration example of a battery pack 300 and an electronic apparatus 400 according to the fourth embodiment of the present technology will be described with reference to FIG. 5. The electronic apparatus 400 includes an electronic circuit 401 of the electronic apparatus main body, and a battery pack 300. The battery pack 300 is electrically connected to the electronic circuit 401 via a positive electrode terminal 331a and a negative electrode terminal 331b. The electronic apparatus 400 has a configuration in which a user can detachably attach the battery pack 300, for example. Note that the configuration of the electronic apparatus 400 is not limited thereto, and the battery pack 300 may be built in the electronic apparatus 400 so that the user can not remove the battery pack 300 from the electronic apparatus 400.

When charging the battery pack 300, the positive electrode terminal 331a and the negative electrode terminal 331b of the battery pack 300 are respectively connected to a positive electrode terminal and a negative electrode terminal of a charger (not shown). Meanwhile, when discharging the battery pack 300 (when using the electronic apparatus 400), the positive electrode terminal 331a and the negative electrode terminal 331b of the battery pack 300 are respectively connected to a positive electrode terminal and a negative electrode terminal of the electronic circuit 401.

Examples of the electronic apparatus 400 include, but not limited to, a laptop personal computer, a tablet computer, a mobile phone (smart phone, etc.), personal digital assistants (PDA), a display apparatus (LCD, EL display, electronic paper, etc.), an imaging apparatus (digital still camera, digital video camera etc.), audio equipment (portable audio player, etc.), game equipment, cordless phone handset, an E-book, an electronic dictionary, a radio, a headphone, a navigation system, a memory card, a pacemaker, a hearing aid, an electric tool, an electric shaver, a refrigerator, an air conditioner, a television receiver, a stereo, a water heater, a microwave, a dishwasher, a washing machine, a dryer, lighting equipment, a toy, medical equipment, a robot, a road conditioner, and a traffic light.

(Electronic Circuit)

The electronic circuit 401 includes, for example, a CPU, a peripheral logic unit, an interface unit, a storage unit, and the like, and controls the entire electronic apparatus 400.

(Battery Pack)

The battery pack 300 includes an assembled battery 301 and a charge/discharge circuit 302. The assembled battery 301 is configured by connecting a plurality of secondary batteries 301a in series and/or in parallel. The plurality of secondary batteries 301a are connected to each other in the form of, for example, n batteries in parallel and m batteries in series (n and m each represent a positive integer). Note that in FIG. 6, an example in which six secondary batteries 301a are connected two each other in the form of 2 batteries in parallel and 3 batteries in series (2P3S) is shown. As the secondary battery 301a, the non-aqueous electrolyte secondary battery according to the second or third embodiment is used.

The charge/discharge circuit 302 is a control unit that controls charging and discharging of the assembled battery 301. Specifically, at the time of charging, the charge/discharge circuit 302 controls charging of the assembled battery 301. Meanwhile, at the time of discharging (i.e., when using the electronic apparatus 400), the charge/discharge circuit 302 controls discharging of the electronic apparatus 400.

Modified Example

In the fourth embodiment described above, the case where the battery pack 300 includes the assembled battery 301 including the plurality of secondary batteries 301a has been described as an example. However, a configuration in which the battery pack 300 includes one secondary battery 301a instead of the assembled battery 301 may be employed.

5. Fifth Embodiment

In a fifth embodiment, a power storage system including the non-aqueous electrolyte secondary battery according to the second or third embodiment in a power storage apparatus will be described. This power storage system may be of any kind as long as it uses electric power, and includes merely a power apparatus. This power system includes, for example, a smart grid, a household energy management system (HEMS), a vehicle, and the like, and can also store electricity.

[Configuration of Power Storage System]

Figure 6:
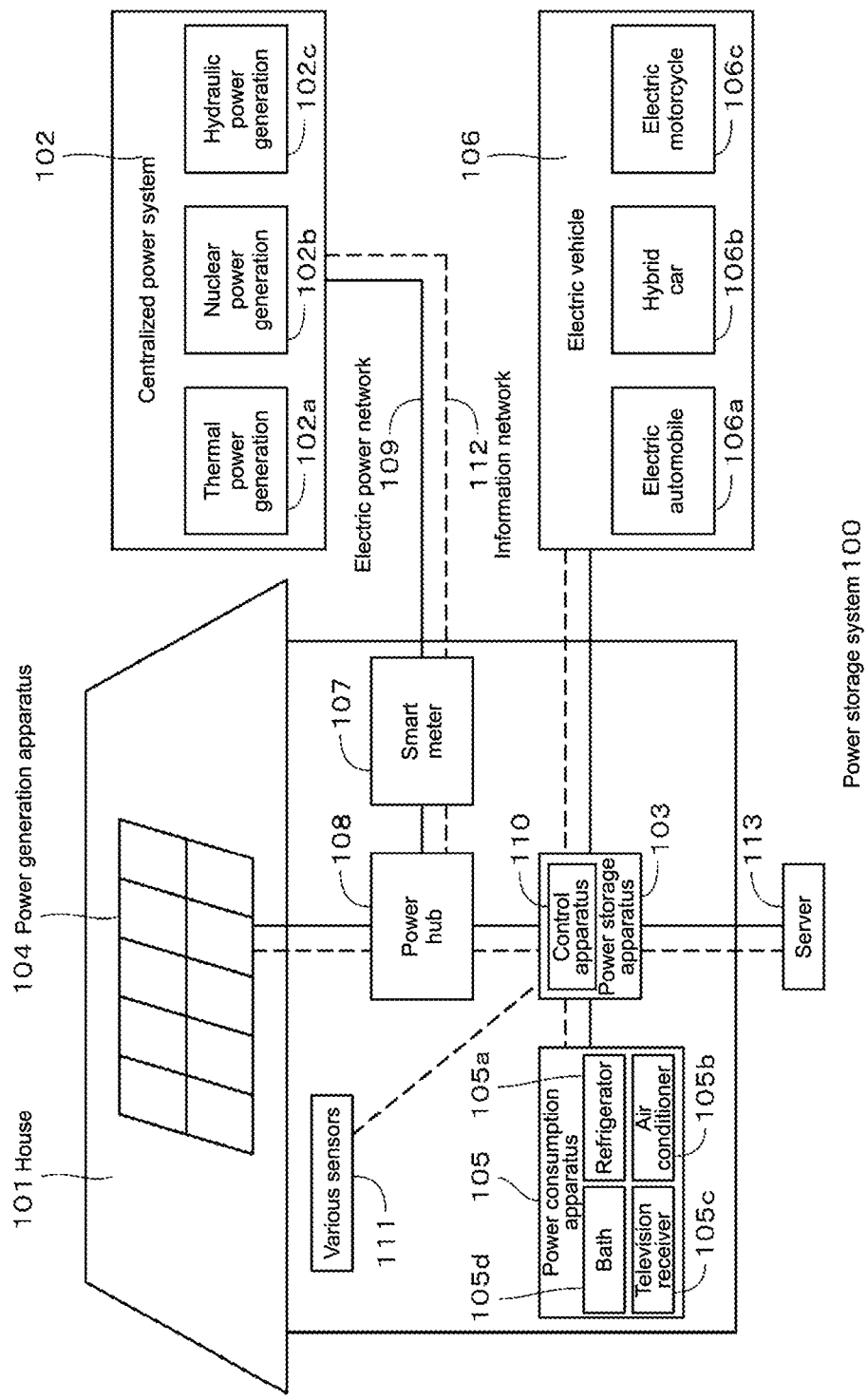
FIG. 6 is a schematic diagram showing a configuration example of a power storage system according to a fifth embodiment of the present technology.

Hereinafter, a configuration example of a power storage system (power system) 100 according to the fifth embodiment will be described with reference to FIG. 6. This power storage system 100 is a power storage system for a house, and electric power is supplied from a centralized power system 102 such as a thermal power generation 102a, a nuclear power generation 102b, and a hydraulic power generation 102c to a power storage apparatus 103 via an electric power network 109, an information network 112, a smart meter 107, a power hub 108, and the like. In addition, electric power is supplied from an independent power source such as a domestic power generation apparatus 104 to the power storage apparatus 103. The electric power supplied to the power storage apparatus 103 is stored. The power storage apparatus 103 is used to supply electric power to be used in the house 101. It is not limited to the house 101, and a similar power storage system can be used for a building.

In the house 101, the domestic power generation apparatus 104, a power consumption apparatus 105, the power storage apparatus 103, a control apparatus 110 that controls each apparatus, the smart meter 107, the power hub 108, and sensors 111 that acquire various types of information are provided. The respective apparatuses are connected to one another via the electric power network 109 and the information network 112. As the domestic power generation apparatus 104, a solar battery, a fuel battery, and the like are used. The generated electric power is supplied to the power consumption apparatus 105 and/or the power storage apparatus 103. The power consumption apparatus 105 includes, for example, a refrigerator 105a, an air conditioner 105b, a television receiver 105c, and a bath 105d. Further, the power consumption apparatus 105 includes an electric vehicle 106. The electric vehicle 106 is an electric automobile 106a, a hybrid car 106b, or an electric motorcycle 106c.

The power storage apparatus 103 includes the non-aqueous electrolyte secondary battery according to the second or third embodiment. The smart meter 107 has a function of monitoring the amount of use of commercial electric power and transmitting the measured amount of use to an electric power company. The power supply of the electric power network 109 may be any one of direct-current power supply, alternating current power supply, and non-contact power supply or combination thereof.

Examples of the various sensors 111 include a motion sensor, an illuminance sensor, an object detection sensor, a power consumption sensor, a vibration sensor, a contact sensor, a temperature sensor, and an infrared sensor. The information acquired by the various sensors 111 is transmitted to the control apparatus 110. On the basis of the information from the sensors 111, a weather state, a person state, and the like are grasped, and it is possible to minimize the energy consumption by automatically controlling the power consumption apparatus 105. Further, the control apparatus 110 is capable of transmitting information on the house 101 to the external electric power company and the like via the Internet.

The power hub 108 executes processing such as branching of a power line and direct current/alternating current conversion. Examples of the communication system of the information network 112 connected to the control apparatus 110 include a method of using a communication interface such as a UART (Universal Asynchronous Receiver-Transceiver: transmission/reception circuit for asynchronous serial communication), and a method of using a sensor network that conforms to wireless communication standards such as Bluetooth (registered trademark), ZigBee, and Wi-Fi. The Bluetooth (registered trademark) system is applied to multimedia communication, and one-to-many connection communication can be performed. ZigBee uses the physical layer of IEEE (Institute of Electrical and Electronics Engineers) 802.15.4. The IEEE802.15.4 is a name of a short-range wireless network standard called PAN (Personal Area Network) or W (Wireless) PAN.

The control apparatus 110 is connected to an external server 113. This server 113 may be managed by any one of the house 101, the electric power company, and a service provider. Information transmitted/received to/from the server 113 is, for example, power consumption information, life pattern information, electric power charge, weather information, disaster information, or information on power transaction. Such information may be transmitted/received to/from the domestic power consumption apparatus (e.g., television receiver). However, it may be transmitted/received to/from an apparatus (e.g., mobile phone) outside the house. Such information may be displayed on an apparatus having a display function such as a television receiver, a mobile phone, and a PDA.

The control apparatus 110 that controls the respective blocks includes a CPU (Central Processing Unit), a RAM (Random Access Memory), a ROM (Read Only Memory), and the like, and is stored in the power storage apparatus 103 in this example. The control apparatus 110 is connected to the power storage apparatus 103, the domestic power generation apparatus 104, the power consumption apparatus 105, the various sensors 111, and the server 113 via the information network 112. The control apparatus 110 has a function of adjusting the amount of use of commercial electric power and the amount of power generation, for example. Note that the control apparatus 110 may additionally have a function of performing power transaction in a power market, for example.

As described above, electric power generated not only by the centralized power system 102 such as the thermal power generation 102a, the nuclear power generation 102b, and the hydraulic power generation 102c but also by the domestic power generation apparatus 104 (solar power generation, wind power generation) can be stored in the power storage apparatus 103. Therefore, even when the amount of electric power generated by the domestic power generation apparatus 104 fluctuates, it is possible to perform control, e.g., keep the amount of electric power transmitted to the outside constant or discharge only a necessary amount of electric power. For example, a possible method is to store electric power obtained by solar power generation in the power storage apparatus 103, and store cheaper midnight electric power in the power storage apparatus 103 at night and use the electric power stored in the power storage apparatus 103 by discharging it in the daytime when power is more expensive.

Note that although the example in which the control apparatus 110 is housed in the power storage apparatus 103 has been described in this example, the control apparatus 110 may be housed in the smart meter 107 or may be independently configured. Further, the power storage system 100 may be used for a plurality of houses in an apartment building or for a plurality of detached houses.

6. Sixth Embodiment

In a sixth embodiment, an electric vehicle including the non-aqueous electrolyte secondary battery according to the second or third embodiment will be described.

[Configuration of Electric Vehicle]

Figure 7:
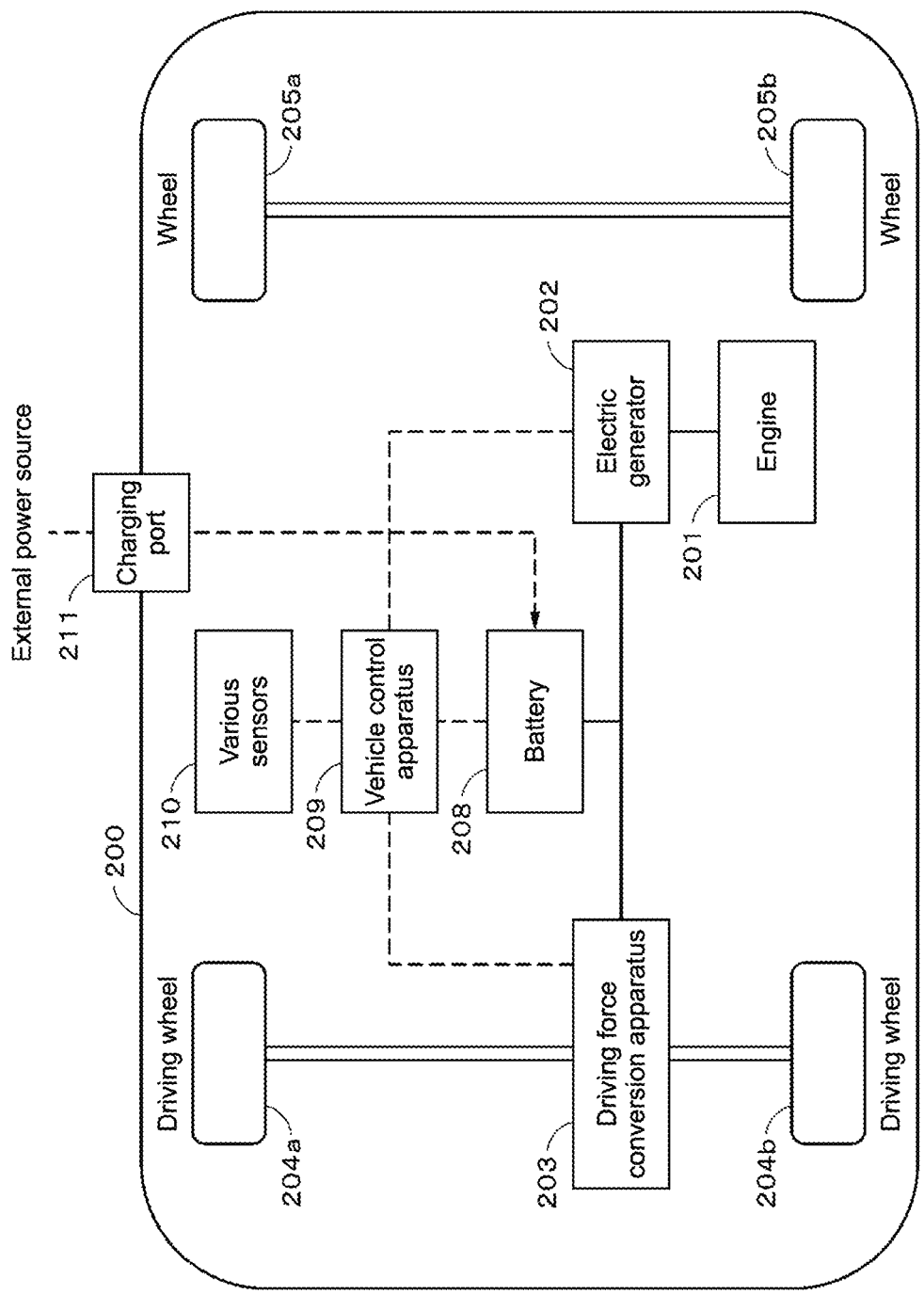
FIG. 7 is a schematic diagram showing a configuration of an electric vehicle according to a sixth embodiment of the present technology.

A configuration example of an electric vehicle according to a sixth embodiment of the present technology will be described with reference to FIG. 7. This hybrid vehicle 200 is a hybrid vehicle that employs a series hybrid system. A vehicle of the series hybrid system runs with an electric power/driving force conversion apparatus 203 by using electric power generated in an electric generator driven by an engine or electric power temporarily stored in a battery.

This hybrid vehicle 200 includes an engine 201, an electric generator 202, the electric power/driving force conversion apparatus 203, a driving wheel 204a, a driving wheel 204b, a wheel 205a, a wheel 205b, a battery 208, a vehicle control apparatus 209, various sensors 210, and a charging port 211. As the battery 208, the non-aqueous electrolyte secondary battery according to the second or third embodiment is used.

The hybrid vehicle 200 runs by using the electric power/driving force conversion apparatus 203 as a power source. An example of the electric power/driving force conversion apparatus 203 is a motor. The electric power/driving force conversion apparatus 203 is actuated due to electric power of the battery 208 and torque of the electric power/driving force conversion apparatus 203 is transmitted to the driving wheels 204a and 204b. Note that the electric power/driving force conversion apparatus 203 can be applied as both of an alternating-current motor and a direct-current motor by using direct current-alternating current (DC-AC) or reverse conversion (AC-DC conversion) at a necessary portion. The various sensors 210 controls r.p.m. of the engine via the vehicle control apparatus 209, opening (throttle opening) of a throttle valve (not shown), and the like. The various sensors 210 include a velocity sensor, an acceleration sensor, an engine r.p.m. sensor, and the like.

The torque of the engine 201 is transmitted to the electric generator 202, and electric power generated with the torque by the electric generator 202 can be stored in the battery 208.

When the hybrid vehicle 200 is decelerated by a braking mechanism (not shown), resistance force at the time of the deceleration is added to the electric power/driving force conversion apparatus 203 as torque, and regenerative electric power generated with this torque by the electric power/driving force conversion apparatus 203 is stored in the battery 208.

By being connected to a power source outside the hybrid vehicle 200 via the charging port 211, the battery 208 is also capable of receiving electric power supply from the external power source by using the charging port 211 as an input port, and storing the received electric power.

Although not shown in the figure, an information processing apparatus that executes information processing relating to vehicle control on the basis of information on a non-aqueous electrolyte secondary battery may be provided. Examples of such an information processing apparatus include an information processing apparatus that displays the remaining capacity of the battery on the basis of information on the remaining capacity of the non-aqueous electrolyte secondary battery.

Note that the series hybrid vehicle that runs with the motor by using electric power generated by the electric generator driven by the engine or electric power temporarily stored in the battery has been described above as an example. However, the present technology can be effectively applied also to a parallel hybrid vehicle that uses output of an engine and output of a motor as driving sources and appropriately switches three systems of running with only the engine, running with only the motor, and running with the engine and the motor for the use. Further, the present technology can be effectively applied also to a so-called electric vehicle, which does not use an engine and runs by driving of only a driving motor.

Example

Hereinafter, the present technology will be specifically described by examples. However, the present technology is not limited to only these examples.

This example will be described in the following order.
i Laminated-type Battery Having Open Circuit Voltage of 4.4 V Using Carbon Material as Negative Electrode Active Material
ii Laminated-type Battery Having Open Circuit Voltage of 4.2 V Using Carbon Material as Negative Electrode Active Material
iii Laminated-type Battery Having Open Circuit Voltage of 4.2 V Using Carbon Material and Silicon Material as Negative Electrode Active Material <i Laminated-Type Battery Having Open Circuit Voltage of 4.4 V Using Carbon Material as Negative Electrode Active Material>

Examples 1-1 to 1-15

(Production Process of Positive Electrode)

A positive electrode was prepared as follows. First, lithium carbonate ($Li_2CO_3$) and cobalt carbonate ($CoCO_3$) were mixed at a molar ratio of 0.5:1 and then burned in air at 900° C. for 5 hours to obtain a lithium cobalt composite oxide ($LiCoO_2$) as a positive electrode active material. Next, 91 parts by mass of the lithium cobalt composite oxide obtained as described above, 6 parts by mass of graphite as a conductive agent, and 3 parts by mass of polyvinylidene fluoride as a binding agent were mixed to obtain a positive electrode mixture, and then, the obtained positive electrode mixture was dispersed in N-methyl-2-pyrrolidone, thereby obtaining a paste-like positive electrode mixture slurry. Next, the positive electrode mixture slurry was applied to both sides of a positive electrode current collector formed of a strip-shaped aluminum foil (having a thickness of 12 μm), dried, and then compression-molded by a roll press machine to form a positive electrode active material layer. Next, a positive electrode lead formed of aluminum was welded and attached to one end of the positive electrode current collector.

(Production Process of Negative Electrode)

A negative electrode was prepared as follows. First, 97 parts by mass of artificial graphite powder as a negative electrode active material and 3 parts by mass of polyvinylidene fluoride as a binding agent were mixed to obtain a negative electrode material mixture, and then, the obtained negative electrode material mixture was dispersed in N-methyl-2-pyrrolidone, thereby obtaining a paste-like negative electrode mixture slurry. Next, the negative electrode mixture slurry was applied to both sides of a negative electrode current collector formed of a strip-shaped copper foil (having a thickness of 12 μm), dried, and then compression-molded by a roll press machine to form a negative electrode active material layer. Next, a negative electrode lead formed of nickel was attached to one end of the negative electrode current collector.

(Production Process of Laminated-Type Battery)

A laminated-type battery was prepared as follows. First, the prepared positive electrode and negative electrode were brought into close contact with each other via a separator formed of a microporous polyethylene film having a thickness of 25 μm, and wound in the longitudinal direction, and a protective tape was attached to the outermost peripheral portion, thereby preparing a wound electrode body having a flat shape. Next, this wound electrode body was loaded between exterior members, and three sides of the exterior member were thermally fused, so that one side of the exterior member was not thermally fused and had an opening. As the exterior member, a moisture resistant aluminum laminated film in which a nylon film having a thickness of 25 μm, an aluminum foil having a thickness of 40 μm, and a polypropylene film having a thickness of 30 μm are laminated in order from the outermost layer was used.

(Preparation of Electrolyte Solution and Pouring Process)

First, ethylene carbonate (EC), propylene carbonate (PC), ethyl methyl carbonate (EMC), and vinylene carbonate (VC) were mixed so that the mass ratio satisfied the following relationship, EC:PC:EMC:VC=39:39:20:2 to prepare a mixed solvent. Next, an electrolyte solution was prepared by dissolving lithium hexafluorophosphate (LiPF$_6$) as an electrolyte salt in this mixed solvent so as to be 1 mol/l. Next, as shown in Table 1, different kinds of first additives for each sample, i.e., the compounds (1-1) to (1-11) and (2-1) to (2-4), were added to the prepared electrolyte solution so that the content of the first additive in the electrolyte solution was 1% by mass. Note that the content of the first additive in the electrolyte solution means the mass percentage with respect to the total mass of the electrolyte solution (i.e., the total mass of the mixed solvent, the electrolyte salt, and the first additive). The electrolyte solution was injected from the opening of the exterior member, the remaining side of the exterior member was thermally fused under reduced pressure and hermetically sealed. Thus, a desired laminated-type battery was obtained. Note that the laminated-type battery was designed so that the open circuit voltage (i.e., battery voltage) at the time of complete charge became 4.4 V by adjusting the amount of positive electrode active material and the amount of negative electrode active material.

Examples 1-16 to 1-21

As shown in Table 1, a laminated-type battery was obtained in a way similar to that in Example 1-1 except that the content of the first additive in the electrolyte solution was changed in the range of 0.001% by mass to 30% by mass Examples 1-28 to 1-32

As shown in Table 1, a laminated-type battery was obtained in a way similar to that in Examples 1-17 to 1-21 except that the compound (1-11) was used as the first additive.

Examples 1-39 to 1-43

As shown in Table 2, a laminated-type battery was obtained in a way similar to that in Examples 1-17 to 1-21 except that the compound (2-1) was used as the first additive.

Examples 1-22 to 1-27

As shown in Table 1, different kinds of second additives for each sample, i.e., 4-fluoro-1,3-dioxolan-2-one (FEC), 4-methyl-1,3-dioxolan-2-one (4MEC), propane sultone (PS), lithium difluorophosphate (LiPF$_2$O$_2$), lithium monofluorophosphate (Li$_2$PFO$_3$), and succinonitrile (SN) were added. In this case, the additive amount of the second additive was adjusted so that the content of the second additive in the electrolyte solution was in the range of 0.2% by mass to 1% by mass. Note that the content of the second additive in the electrolyte solution means the mass percentage with respect to the total mass of the electrolyte solution (i.e., the total mass of the mixed solvent, the electrolyte salt, the first additive, and the second additive). Other than this, a laminated-type battery was obtained in a way similar to that in Example 1-1.

Examples 1-33 to 1-38

As shown in Table 1, a laminated-type battery was obtained in a way similar to that in Examples 1-22 to 1-27 except that the compound (1-11) was used as the first additive.

Examples 1-44 to 1-49

As shown in Table 2, a laminated-type battery was obtained in a way similar to that in Examples 1-22 to 1-27 except that the compound (2-1) was used as the first additive.

Example 1-50

As shown in Table 2, a laminated battery was obtained in a way similar to that in Example 1-1 except that a mixed solvent obtaining by preparing ethylene carbonate (EC), propylene carbonate (PC), and ethyl methyl carbonate (EMC) as solvents so that the mass ratio satisfied the following relationship, EC:PC:EMC=40:40:20 was used.

Example 1-51

As shown in Table 2, a laminated battery was obtained in a way similar to that in Example 1-1 except that a mixed solvent obtaining by preparing ethylene carbonate (EC) and ethyl methyl carbonate (EMC) as solvents so that the mass ratio satisfied the following relationship, EC:EMC=50:50 was used.

Comparative Example 1-1

As shown in Table 2, a laminated-type battery was obtained in a way similar to that in Example 1-1 except that an electrolyte solution prepared by adding no first additive was used.

Comparative Examples 1-2 to 1-6

As shown in Table 2, a laminated-type battery was obtained in a way similar to that in Examples 1-22 to 1-27 except that an electrolyte solution prepared by adding no first additive was used.

Comparative Example 1-8

As shown in Table 2, a laminated-type battery was obtained in a way similar to that in Example 1-1 except that pentafluoroanisole was used as the first additive.

(Resistance Measurement During 4.4 V Charging)

The battery resistances of the laminated-type batteries of Examples 1-1 to 1-51 and Comparative Examples 1-1 to 1-8 obtained as described above were measured as follows. First, the batteries were charged under conditions of an ambient temperature of 23° C., charging voltage of 4.4 V, charging current of 0.5 mA, and a charging time of 10 hours, and then stored in an environment at a high temperature of 70° C. for 300 hours. After storage, the battery was allowed to stand until it was cooled to room temperature, and the resistance value at a frequency of 1 kHz was measured as cell resistance using an internal resistance measuring device. The results are shown in Tables 1 and 2.

Tables 1 and 2 show the configurations and evaluation results of the laminated-type batteries of Examples 1-1 to 1-51 and Comparative Examples 1-1 to 1-8.

TABLE 1

| | Electrolyte salt | Non-aqueous solvent (mixture ratio) | First additive Kind | First additive Content (% by weight) | Second additive Kind | Second additive Content (% by weight) | Resistance after 300 H storage (Ohm) |
|---|---|---|---|---|---|---|---|
| Example 1-1 | LiPF$_6$ | EC/PC/EMC/VC (39:39:20:2) | (1-1) | 1 | — | — | 79 |
| Example 1-2 | | | (1-2) | 1 | — | — | 81 |
| Example 1-3 | | | (1-3) | 1 | — | — | 74 |
| Example 1-4 | | | (1-4) | 1 | — | — | 89 |
| Example 1-5 | | | (1-5) | 1 | — | — | 103 |
| Example 1-6 | | | (1-6) | 1 | — | — | 103 |
| Example 1-7 | | | (1-7) | 1 | — | — | 81 |
| Example 1-8 | | | (1-8) | 1 | — | — | 80 |
| Example 1-9 | | | (1-9) | 1 | — | — | 92 |
| Example 1-10 | | | (1-10) | 1 | — | — | 77 |
| Example 1-11 | | | (1-11) | 1 | — | — | 74 |
| Example 1-12 | | | (2-1) | 1 | — | — | 73 |
| Example 1-13 | | | (2-2) | 1 | — | — | 71 |
| Example 1-14 | | | (2-3) | 1 | — | — | 73 |
| Example 1-15 | | | (2-4) | 1 | — | — | 72 |
| Example 1-16 | | | (1-1) | 0.001 | — | — | 120 |
| Example 1-17 | | | | 0.01 | — | — | 88 |
| Example 1-18 | | | | 0.1 | — | — | 80 |
| Example 1-19 | | | | 5 | — | — | 83 |
| Example 1-20 | | | | 10 | — | — | 90 |
| Example 1-21 | | | | 30 | — | — | 105 |
| Example 1-22 | | | | 1 | FEC | 1 | 71 |
| Example 1-23 | | | | | 4MEC | 1 | 70 |
| Example 1-24 | | | | | PS | 1 | 74 |
| Example 1-25 | | | | | LiPF$_2$O$_2$ | 0.3 | 70 |
| Example 1-26 | | | | | Li$_2$PFO$_3$ | 0.2 | 75 |
| Example 1-27 | | | | | SN | 1 | 76 |
| Example 1-28 | | | (1-11) | 0.01 | — | — | 78 |
| Example 1-29 | | | | 0.1 | — | — | 72 |
| Example 1-30 | | | | 5 | — | — | 75 |
| Example 1-31 | | | | 10 | — | — | 88 |
| Example 1-32 | | | | 30 | — | — | 104 |
| Example 1-33 | | | | 1 | FEC | 1 | 70 |
| Example 1-34 | | | | | 4MEC | 1 | 69 |
| Example 1-35 | | | | | PS | 1 | 72 |
| Example 1-36 | | | | | LiPF$_2$O$_2$ | 0.3 | 69 |
| Example 1-37 | | | | | Li$_2$PFO$_3$ | 0.2 | 73 |
| Example 1-38 | | | | | SN | 1 | 75 |

TABLE 2

| | Electrolyte salt | Non-aqueous solvent (mixture ratio) | First additive Kind | First additive Content (% by weight) | Second additive Kind | Second additive Content (% by weight) | Resistance after 300 H storage (Ohm) |
|---|---|---|---|---|---|---|---|
| Example 1-39 | LiPF$_6$ | EC/PC/EMC/VC (39:39:20:2) | (2-1) | 0.01 | — | — | 76 |
| Example 1-40 | | | | 0.1 | — | — | 71 |
| Example 1-41 | | | | 5 | — | — | 73 |
| Example 1-42 | | | | 10 | — | — | 86 |
| Example 1-43 | | | | 30 | — | — | 100 |
| Example 1-44 | | | | 1 | FEC | 1 | 69 |
| Example 1-45 | | | | | 4MEC | 1 | 68 |
| Example 1-46 | | | | | PS | 1 | 71 |
| Example 1-47 | | | | | LiPF$_2$O$_2$ | 0.3 | 68 |
| Example 1-48 | | | | | Li$_2$PFO$_3$ | 0.2 | 72 |
| Example 1-49 | | | | | SN | 1 | 74 |
| Example 1-50 | | EC/PC/EMC (40:40:20) | (1-1) | 1 | — | — | 82 |
| Example 1-51 | | EC/EMC (50:50) | | | — | — | 85 |
| Comparative Example 1-1 | | EC/PC/EMC/VC (39:39:20:2) | — | — | — | — | 121 |
| Comparative Example 1-2 | | | — | — | FEC | 1 | 125 |
| Comparative Example 1-3 | | | — | — | 4MEC | 1 | 125 |
| Comparative Example 1-4 | | | — | — | PS | 1 | 131 |

TABLE 2-continued

| | Electrolyte salt | Non-aqueous solvent (mixture ratio) | First additive Kind | First additive Content (% by weight) | Second additive Kind | Second additive Content (% by weight) | Resistance after 300 H storage (Ohm) |
|---|---|---|---|---|---|---|---|
| Comparative Example 1-5 | | | — | — | LiPF$_2$O$_2$ | 0.3 | 125 |
| Comparative Example 1-6 | | | — | — | Li$_2$PFO$_3$ | 0.2 | 123 |
| Comparative Example 1-7 | | | — | — | SN | 1 | 140 |
| Comparative Example 1-8 | | | Perfluorinated | 1 | — | — | 144 |

Note that the compounds (1-1) to (1-11) in Tables 1 and 2 are specific examples of the compound (1) shown below.

Compounds (1-1), (1-2), and (1-4) to (1-9): specific examples of the compound (1) in which A is a monovalent saturated hydrocarbon group Compounds (1-3) and (1-11): specific examples of the compound (1) in which A in the compound (1) is a monovalent unsaturated hydrocarbon group Compound (1-10): specific example of the compound (1) in which A is a monovalent halogenated saturated hydrocarbon group Further, the compounds (2-1) to (2-4) in Tables 1 and 2 are specific examples of the compound (2) shown below.

Compound (2-1): specific example of the compound (2) in which B is a divalent saturated hydrocarbon group Compounds (2-2) and (2-4): specific examples of the compound (2) in which B is a divalent unsaturated hydrocarbon group Compound (2-3): specific example of compound (2) in which B is a divalent halogenated saturated hydrocarbon group From Table 1 and Table 2, the following can be seen.

By using an electrolyte solution containing the compound (1) or the compound (2), an increase in battery resistance during high-temperature storage can be suppressed. Note that also in the case of using an electrolyte solution containing both the compound (1) and the compound (2), an increase in battery resistance can be similarly suppressed.

The increase in battery resistance during high-temperature storage can be suppressed more in the case where an electrolyte solution containing the compound (2) that is a dimer is used, that the case where an electrolyte solution containing the compound (1) that is a monomer is used. This is considered to be because the electrolyte solution containing the compound (2) is superior to the electrolyte solution containing the compound (1) in the film forming ability on the electrode.

In the electrolyte solution containing the compound (1) that is a monomer, in the case where A is a monovalent unsaturated hydrocarbon group (e.g., compounds (1-3) and (1-11)) or a monovalent halogenated saturated hydrocarbon group (e.g., compound (1-10)), an increase in battery resistance can be particularly suppressed. This is considered to be because in the case where A is an unsaturated hydrocarbon group or a halogenated saturated hydrocarbon group, an excellent film forming ability on the electrode is achieved. Note that also in the case where A is a monovalent halogenated unsaturated hydrocarbon group, a high effect can be achieved similarly as described above.

In the electrolyte solution containing the compound (2) that is a dimer, in the case where B is a divalent unsaturated hydrocarbon group (e.g., compounds (2-2) and (2-4)), an increase in battery resistance can be particularly suppressed. This is considered to be because in the case where B is an unsaturated hydrocarbon group, an excellent film forming ability on the electrode is achieved. Note that also in the case where A is a divalent halogenated unsaturated hydrocarbon group, a high effect can be achieved similarly as described above.

As the number of fluorine groups contained in Rf$_A$ in the compound (1) increases, the increase in battery resistance can be suppressed (e.g., compounds (1-1), (1-2), (1-4), and (1-7) to (1-9)). In order to obtain a particularly high effect of suppressing increase in battery resistance, it is favorable that Rf$_A$ in the compound (1) is perfluorinated (compounds (1-1), (1-2), (1-7), and (1-8)).

From the viewpoint of suppressing an increase in battery resistance, the content of the first additive in the electrolyte solution is favorably not less than 0.01% by mass and not more than 30% by mass, and more favorably not less than 0.1% by mass and not more than 5% by mass.

Since the electrolyte solution contains both of the first additive and the second additive, it is possible to further suppress an increase in battery resistance during storage. It is not clear why the effect of suppressing the increase in battery resistance at the time of storage is further improved by the combination of the first additive and the second additive. However, it is presumed that this is because a coating film derived from both the first additive and the second additive is formed on the electrode.

<ii Laminated-Type Battery Having Open Circuit Voltage of 4.2 V Using Carbon Material as Negative Electrode Active Material>

Example 2-1

The amount of positive electrode active material and the amount of negative electrode active material were adjusted so that the open circuit voltage (i.e., battery voltage) at the time of complete charge was 4.2 V. Other than this, a laminated-type battery was obtained in a way similar to that in Example 1-1.

Comparative Example 2-1

A laminated-type battery was obtained in a way similar to that in Example 2-1 except that the electrolyte solution prepared by adding no first additive was used.

(Resistance Measurement During 4.2 V Charging)

The battery resistances of the laminated-type batteries of Example 2-1 and Comparative Example 2-1 obtained as described above were measured as cell resistances in a way similar to "Resistance Measurement during 4.4 V Charging" described above, except for changing the charging voltage to 4.2 V. The results are shown in Table 3.

Table 3 shows the configurations and evaluation results of the laminated-type batteries of Example 2-1 and Comparative Example 2-1.

TABLE 3

| | Electrolyte salt | Non-aqueous solvent (mixture ratio) | First additive Kind | First additive Content (% by weight) | Second additive Kind | Second additive Content (% by weight) | Resistance after 300 H storage (Ohm) |
|---|---|---|---|---|---|---|---|
| Example 2-1 | LiPF$_6$ | EC/PC/EMC/VC (39:39:20:2) | (1-1) | 1 | — | — | 70 |
| Comparative Example 2-1 | | | — | — | — | — | 110 |

From Table 3, the following can be seen.

By using an electrolyte solution containing the compound (1), also in a battery having an open circuit voltage of 4.2 V, it is possible to suppress an increase in battery resistance during high-temperature storage. Note that also in the case where an electrolyte solution containing the compound (2) or an electrolyte solution containing both of the compound (1) and the compound (2) is used, an effect of suppressing resistance increase can be achieved similarly as described above.

<iii Laminated-Type Battery Having Open Circuit Voltage of 4.2 V Using Carbon Material and Silicon Material as Negative Electrode Active Material>

Example 3-1

In the process of preparing the negative electrode, 10 parts by mass of silicon powder and 90% by mass of carbon powder were mixed to obtain a negative electrode mixture, and then the obtained negative electrode mixture was dispersed in N-methyl-2-pyrrolidone to obtain paste-like negative electrode mixture slurry. Other than this, a laminated-type battery was obtained in a way similar to that in Example 2-1.

Comparative Example 3-1

A laminated-type battery was obtained in a way similar to that in Example 3-1 except that the electrolyte solution prepared by adding no first additive was used.

(Resistance Measurement During 4.2 V Charging)

The battery resistances of the laminated-type batteries of Example 3-1 and Comparative Example 3-1 obtained as described above were measured as cell resistances in a way similar to "Resistance Measurement during 4.4 V Charging" described above, except for changing the charging voltage to 4.2 V. The results are shown in Table 4.

Table 4 shows the configurations and evaluation results of the laminated-type batteries of Example 3-1 and Comparative Example 3-1.

temperature storage can be suppressed. Note that also in the case where an electrolyte solution containing the compound (2) or an electrolyte solution containing both the compound (1) and the compound (2) is used, the effect of suppressing an increase in resistance can be obtained similarly as described above.

Although the embodiments, modified examples thereof, and examples of the present technology has been specifically described heretofore, the present technology is not limited to the above-mentioned embodiments, the modified examples thereof, and examples, and various modifications can be made on the basis of the technical ideas of the present technology.

For example, configurations, methods, processes, shapes, materials, numerical values, and the like mentioned in the above-mentioned embodiments, modified examples thereof, and examples are merely examples, and different configurations, methods, processes, shapes, materials, numerical values, and the like may be used as necessary.

Further, the configurations, methods, processes, shapes, materials, numerical values, and the like of the above-mentioned embodiments, modified examples, and examples can be combined with each other as long as they do not depart from the essence of the present technology.

Further, in the embodiments and examples described above, examples in which the present technology is applied to a cylindrical-type battery, a flat-type battery, a rectangular-type battery, and a coin-type battery have been described, but the shape of the battery is not particularly limited. For example, the present technology is also applicable to flexible batteries and the like mounted on wearable terminals such as a smart watch, a head mounted display, and iGlass (registered trademark).

Further, in the embodiments and examples described above, examples in which the present technology is applied to a battery having a wound structure have been described. However, the structure of the battery is not limited thereto, and the present technology is also applicable to a battery

TABLE 4

| | Electrolyte salt | Non-aqueous solvent (mixture ratio) | First additive Kind | First additive Content (% by weight) | Second additive Kind | Second additive Content (% by weight) | Resistance after 300 H storage (Ohm) |
|---|---|---|---|---|---|---|---|
| Example 3-1 | LiPF$_6$ | EC/PC/EMC/VC (39:39:20:2) | (1-1) | 1 | — | — | 85 |
| Comparative Example 3-2 | | | — | — | — | — | 141 |

From Table 4, the following can be seen.

Also in a battery containing silicon as a negative electrode active material, by using an electrolyte solution containing the compound (1), an increase in resistance during high-having a structure in which a positive electrode and a negative electrode are folded or stacked.

Further, in the embodiments and examples described above, the configuration in which the electrode includes the current collector and the active material layer has been described as an example, but the configuration of the electrode is not limited thereto. For example, the electrode may include only the active material layer.

Further, the present technology may take the following configurations.

(1)

An electrolyte solution, including:

at least one of compounds represented by the following formulae (1) and (2).

[Chem. 1]

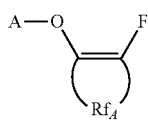

(1)

(in the formula (1), F represents a fluorine group. A represents a monovalent saturated hydrocarbon group, a monovalent unsaturated hydrocarbon group, a monovalent halogenated saturated hydrocarbon group, or a monovalent halogenated unsaturated hydrocarbon group. $Rf_A$ forms a ring and contains at least one $—CR_{A2}—$ group, in which $R_A$ represents a hydrogen group, a fluorine group, a monovalent saturated hydrocarbon group, a monovalent unsaturated hydrocarbon group, a monovalent halogenated saturated hydrocarbon group, or a monovalent halogenated unsaturated hydrocarbon group.)

[Chem. 2]

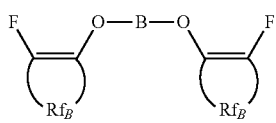

(2)

(in the formula (2), F represents a fluorine group. B represents a divalent saturated hydrocarbon group, a divalent unsaturated hydrocarbon group, a divalent halogenated saturated hydrocarbon group, or a divalent halogenated unsaturated hydrocarbon group. $Rf_B$ forms a ring and contains at least one $—CR_{B2}—$ group, in which $R_B$ represents a hydrogen group, a fluorine group, a monovalent saturated hydrocarbon group, a monovalent unsaturated hydrocarbon group, a monovalent halogenated saturated hydrocarbon group, or a monovalent halogenated unsaturated hydrocarbon group.)

(2)

The electrolyte solution according to (1), further including at least one kind selected from the group consisting of halogenated carbonate, unsaturated cyclic carbonate, sultone, lithium difluorophosphate, lithium monofluorophosphate, and nitrile compound.

(3)

The electrolyte solution according to (2), in which the halogenated carbonic acid ester is at least one of compounds represented by the formula (3), the unsaturated cyclic ester carbonate is at least one of compounds represented by formula (5), and the sultone is at least one of compounds represented by the formula (6).

[Chem. 7]

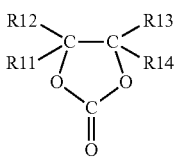

(3)

(in the formula (3), R11 to R14 each independently represent a hydrogen group, a halogen group, a monovalent hydrocarbon group, or a monovalent halogenated hydrocarbon group, and at least one of R11 to R14 is a halogen group or a monovalent halogenated hydrocarbon group.)

[Chem. 9]

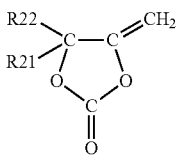

(5)

(in the formula (5), R21 and R22 each independently represent a hydrogen group, a halogen group, a monovalent hydrocarbon group, or a monovalent halogenated hydrocarbon group.)

[Chem. 10]

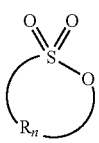

(6)

(in the formula (6), Rn is a divalent hydrocarbon group having n carbon atoms, a ring being formed by the divalent hydrocarbon group together with S (sulfur) and O (oxygen). N represents 2 to 5. The ring may contain an unsaturated double bond.)

(4)

The electrolyte solution according to any one of (1) to (3), in which the content of the at least one of compounds represented by the formula (1) and the formula (2) is not less than 0.01% by mass and not more than 30% by mass.

(5)

The electrolyte solution according to any one of (1) to (4), in which the A represents a monovalent unsaturated hydrocarbon group, and the B represents a divalent unsaturated hydrocarbon group.

(6)

The electrolyte solution according to any one of (1) to (4), in which the A is a monovalent halogenated saturated hydrocarbon group or a monovalent halogenated unsaturated hydrocarbon group, and the B is a divalent halogenated unsaturated hydrocarbon group.

(7)

The electrolyte solution according to any one of (1) to (6), in which the $Rf_A$ and the $Rf_B$ are perfluorinated.

(8)

A battery, including:

a positive electrode;

a negative electrode; and the electrolyte solution according to any one of (1) to (7).

(9)

The battery according to (8), in which the negative electrode contains silicon as a negative electrode active material.

(10)

A battery pack, including:

the battery according to (8) or (9); and a control unit that controls the battery.

(11)

An electronic apparatus, that receives power supply from the battery according to (8) or (9).

(12)

An electric vehicle, including:

the battery according to (8) or (9);

a converting apparatus that receives supply of power from the battery and converts the received power into a driving force for the electric vehicle; and a control apparatus that performs information processing relating to vehicle control on the basis of information on the battery.

(13)

A power storage apparatus, including:

the battery according to (8) or (9), in which the power storage apparatus supplies power to an electronic apparatus connected to the battery.

(14)

The power storage apparatus according to (13), further including a power information control apparatus that transmits/receives a signal to/from another apparatus via a network, in which the power storage apparatus controls, on the basis of information received by the power information control apparatus, charge and discharge of the battery.

(15)

A power system, that receives power supply from the battery according to (8) or (9).

(16)

The power system according to (15), in which power is supplied from a power generation apparatus or a power network to the battery.

REFERENCE SIGNS LIST 11 battery can
12, 13 insulating plate
14 battery lid
15 safety valve mechanism
15A disc plate
16 heat sensitive resistance element
17 gasket
20 wound electrode body
21 positive electrode
21A positive electrode current collector
21B positive electrode active material layer
22 negative electrode
22A negative electrode current collector
22B negative electrode active material layer
23 separator
24 center pin
25 positive electrode lead
26 negative electrode lead

The invention claimed is:

1. An electrolyte solution, comprising:

a first additive including a compound represented by a following formula (1):

[Chem. 2]

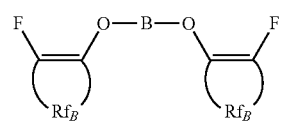

(1)

(in the formula (1), F represents a first fluorine group, B represents one of a divalent saturated hydrocarbon group, a divalent unsaturated hydrocarbon group, a divalent halogenated saturated hydrocarbon group, or a divalent halogenated unsaturated hydrocarbon group, and $Rf_B$ forms a ring and contains at least one $—CR_{B2}—$ group, wherein $R_B$ represents one of a first hydrogen group, a second fluorine group, a monovalent saturated hydrocarbon group, a monovalent unsaturated hydrocarbon group, a monovalent halogenated saturated hydrocarbon group, or a monovalent halogenated unsaturated hydrocarbon group).

2. The electrolyte solution according to claim 1, further comprising a second additive that includes at least one selected from a group consisting of halogenated carbonic acid ester, unsaturated cyclic ester carbonate, sultone, lithium difluorophosphate, lithium monofluorophosphate, and nitrile compound.

3. The electrolyte solution according to claim 2, wherein the halogenated carbonic acid ester is at least one of compounds represented by a formula (3), the unsaturated cyclic ester carbonate is at least one of compounds represented by a formula (5), and the sultone is at least one of compounds represented by a formula (6)

[Chem. 7]

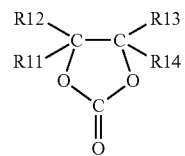

(3)

(in the formula (3), R11 to R14 each independently represents one of a second hydrogen group, a first halogen group, a first monovalent hydrocarbon group, or a first monovalent halogenated hydrocarbon group, and at least one of R11 to R14 is one of the first halogen group or the first monovalent halogenated hydrocarbon group)

[Chem. 9]

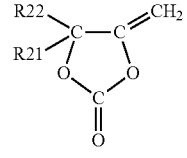

(5)

(in the formula (5), R21 and R22 each independently represents one of a third hydrogen group, a second halogen group, a second monovalent hydrocarbon group, or a second monovalent halogenated hydrocarbon group)

[Chem. 10]

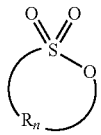

(6)

(in the formula (6), Rn is a divalent hydrocarbon group having n carbon atoms, a ring being formed by the divalent hydrocarbon group together with S (sulfur) and O (oxygen), n represents 2 to 5, and the ring contains an unsaturated double bond).

4. The electrolyte solution according to claim 1, wherein content of the compound represented by the formula (1) is not less than 0.01% by mass and not more than 30% by mass.

5. The electrolyte solution according to claim 1, wherein the B represents the divalent unsaturated hydrocarbon group.

6. The electrolyte solution according to claim 1, wherein the B is a divalent halogenated unsaturated hydrocarbon group.

7. The electrolyte solution according to claim 1, wherein the $Rf_B$ is perfluorinated.

8. A battery, comprising:
a positive electrode;
a negative electrode; and
an electrolyte solution, wherein
the electrolyte solution comprises an additive including a compound represented by a following formula (1):

[Chem. 2]

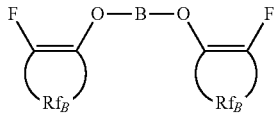

(1)

(in the formula (1), F represents a first fluorine group, B represents one of a divalent saturated hydrocarbon group, a divalent unsaturated hydrocarbon group, a divalent halogenated saturated hydrocarbon group, or a divalent halogenated unsaturated hydrocarbon group, and $Rf_B$ forms a ring and contains at least one —$CR_{B2}$— group, wherein $R_B$ represents one of a hydrogen group, a second fluorine group, a monovalent saturated hydrocarbon group, a monovalent unsaturated hydrocarbon group, a monovalent halogenated saturated hydrocarbon group, or a monovalent halogenated unsaturated hydrocarbon group).

9. The battery according to claim 8, wherein the negative electrode contains silicon as a negative electrode active material.

10. A battery pack, comprising:
a battery, wherein the battery comprises:
a positive electrode;
a negative electrode; and
an electrolyte solution, wherein
the electrolyte solution comprises an additive including a compound represented by a following formula (1):

[Chem. 2]

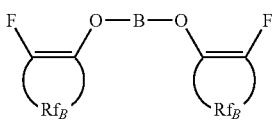

(1)

(in the formula (1), F represents a first fluorine group, B represents one of a divalent saturated hydrocarbon group, a divalent unsaturated hydrocarbon group, a divalent halogenated saturated hydrocarbon group, or a divalent halogenated unsaturated hydrocarbon group, and $Rf_B$ forms a ring and contains at least one —$CR_{B2}$— group, wherein $R_B$ represents one of a hydrogen group, a second fluorine group, a monovalent saturated hydrocarbon group, a monovalent unsaturated hydrocarbon group, a monovalent halogenated saturated hydrocarbon group, or a monovalent halogenated unsaturated hydrocarbon group); and
a control unit configured to control the battery.

11. An electronic apparatus configured to receive power supply from a battery, wherein the battery comprises:
a positive electrode;
a negative electrode; and
an electrolyte solution, wherein
the electrolyte solution comprises an additive including a compound represented by a following formula (1):

[Chem. 2]

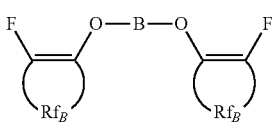

(1)

(in the formula (1), F represents a first fluorine group, B represents one of a divalent saturated hydrocarbon group, a divalent unsaturated hydrocarbon group, a divalent halogenated saturated hydrocarbon group, or a divalent halogenated unsaturated hydrocarbon group, and $Rf_B$ forms a ring and contains at least one —$CR_{B2}$— group, wherein $R_B$ represents one of a hydrogen group, a second fluorine group, a monovalent saturated hydrocarbon group, a monovalent unsaturated hydrocarbon group, a monovalent halogenated saturated hydrocarbon group, or a monovalent halogenated unsaturated hydrocarbon group).

12. An electric vehicle, comprising:
a battery, wherein the battery comprises:
a positive electrode;
a negative electrode; and
an electrolyte solution, wherein
the electrolyte solution comprises an additive including a compound represented by a following formula (1):

[Chem. 2]

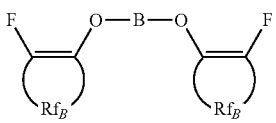

(1)

(in the formula (1), F represents a first fluorine group, B represents one of a divalent saturated hydrocarbon group, a divalent unsaturated hydrocarbon group, a divalent halogenated saturated hydrocarbon group, or a divalent halogenated unsaturated hydrocarbon group, and $Rf_B$ forms a ring and contains at least one —$CR_{B2}$— group, wherein $R_B$ represents one of a hydrogen group, a second fluorine group, a monovalent saturated hydrocarbon group, a monovalent unsaturated hydrocarbon group, a monovalent halogenated saturated hydrocarbon group, or a monovalent halogenated unsaturated hydrocarbon group);

a converting apparatus configured to:
receive supply of power from the battery; and
convert the received supply of power into a driving force for the electric vehicle; and a control apparatus configured to perform an information process relating to vehicle control on a basis of information on the battery.

13. A power storage apparatus, comprising:
a battery, wherein
the battery comprises:
a positive electrode;
a negative electrode; and
an electrolyte solution, wherein
the electrolyte solution comprises an additive including a compound represented by a following formula (1):

[Chem. 2]

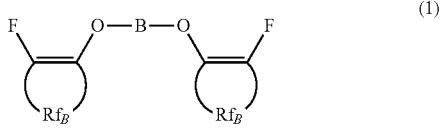

(1)

(in the formula (1), F represents a first fluorine group, B represents one of a divalent saturated hydrocarbon group, a divalent unsaturated hydrocarbon group, a divalent halogenated saturated hydrocarbon group, or a divalent halogenated unsaturated hydrocarbon group, and $Rf_B$ forms a ring and contains at least one —$CR_{B2}$— group, wherein $R_B$ represents one of a hydrogen group, a second fluorine group, a monovalent saturated hydrocarbon group, a monovalent unsaturated hydrocarbon group, a monovalent halogenated saturated hydrocarbon group, or a monovalent halogenated unsaturated hydrocarbon group), and the power storage apparatus configured to supply power to an electronic apparatus connected to the battery.

14. The power storage apparatus according to claim 13, further comprising a power information control apparatus configured to at least one of transmit a signal to another apparatus via a network or receive the signal from the another apparatus via the network, wherein
the power storage apparatus configured to control, on a basis of information received by the power information control apparatus, charge of the battery and discharge of the battery.

15. A power system, comprising:
circuitry configured to receive supply of power from a battery, wherein the battery comprises:
a positive electrode;
a negative electrode; and
an electrolyte solution, wherein
the electrolyte solution comprises an additive including a compound represented by a following formula (1):

[Chem. 2]

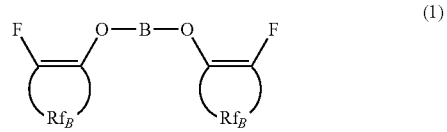

(1)

(in the formula (1), F represents a first fluorine group, B represents one of a divalent saturated hydrocarbon group, a divalent unsaturated hydrocarbon group, a divalent halogenated saturated hydrocarbon group, or a divalent halogenated unsaturated hydrocarbon group, and $Rf_B$ forms a ring and contains at least one —$CR_{B2}$— group, wherein $R_B$ represents one of a hydrogen group, a second fluorine group, a monovalent saturated hydrocarbon group, a monovalent unsaturated hydrocarbon group, a monovalent halogenated saturated hydrocarbon group, or a monovalent halogenated unsaturated hydrocarbon group).

16. The power system according to claim 15, wherein
the power is supplied from one of a power generation apparatus or a power network to the battery.

* * * * *